（12) United States Patent
Smith et al.

(10) Patent No.: US 10,921,537 B2
(45) Date of Patent: Feb. 16, 2021

(54) OPTICAL COMMUNICATION ASSEMBLIES

(71) Applicant: 3M INNOVATIVE PROPERTIES COMPANY, St. Paul, MN (US)

(72) Inventors: Terry L. Smith, Roseville, MN (US); Barry J. Koch, Florence, TX (US); Michael A. Haase, St. Paul, MN (US); Alexander R. Mathews, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/929,650

(22) Filed: May 14, 2020

(65) Prior Publication Data

US 2020/0271876 A1    Aug. 27, 2020

Related U.S. Application Data

(60) Continuation of application No. 16/186,645, filed on Nov. 12, 2018, now Pat. No. 10,690,870, which is a (Continued)

(51) Int. Cl.
*G02B 6/42*    (2006.01)
*G02B 6/38*    (2006.01)
(Continued)

(52) U.S. Cl.
CPC ............ *G02B 6/4292* (2013.01); *G02B 6/32* (2013.01); *G02B 6/34* (2013.01); *G02B 6/383* (2013.01);
(Continued)

(58) Field of Classification Search
None
See application file for complete search history.

(56) References Cited

U.S. PATENT DOCUMENTS 5,408,552 A    4/1995   Davenport
5,802,230 A    9/1998   Kuribayashi
(Continued)

FOREIGN PATENT DOCUMENTS

JP        2007011060         1/2007
WO     WO 2012-097979       7/2012
(Continued)

OTHER PUBLICATIONS

International Search Report for PCT International Application No. PCT/US2014/055461 dated Feb. 6, 2015, 6 pages.

*Primary Examiner* — Michael Stahl
(74) *Attorney, Agent, or Firm* — Robert S. Moshrefzadeh

(57) ABSTRACT

An optical communication subassembly includes one or more optoelectronic devices, one or more optical elements, and a transceiver light coupling unit. Each optical element is configured to change a divergence of the outgoing light relative to a divergence of the incoming light and is spaced apart from and optically aligned with a corresponding optoelectronic device. The transceiver light coupling unit has a mating surface configured for mating with a connector light coupling unit attached to an optical waveguide. A mating direction of the optical light coupling unit forms an angle with the mating surface of the transceiver light coupling unit such that when the connector light coupling unit mates with the transceiver light coupling unit, the angle between the mating direction of the connector light coupling unit and the mating surface of the transceiver light coupling unit causes the optical waveguide to bend.

5 Claims, 29 Drawing Sheets

Related U.S. Application Data division of application No. 15/021,560, filed as application No. PCT/US2014/055461 on Sep. 12, 2014, now Pat. No. 10,162,140.

(60) Provisional application No. 61/878,422, filed on Sep. 16, 2013.

(51) Int. Cl.
  *G02B 6/32* (2006.01)
  *G02B 6/34* (2006.01)
  *H04B 10/40* (2013.01)

(52) U.S. Cl.
  CPC .......... *G02B 6/3885* (2013.01); *G02B 6/423* (2013.01); *G02B 6/425* (2013.01); *G02B 6/4206* (2013.01); *G02B 6/428* (2013.01); *G02B 6/4214* (2013.01); *G02B 6/4245* (2013.01); *G02B 6/4246* (2013.01); *G02B 6/4251* (2013.01); *H04B 10/40* (2013.01)

(56) References Cited

U.S. PATENT DOCUMENTS

| | | |
|---|---|---|
| 6,116,791 A | 9/2000 | Laninga |
| 6,257,772 B1 | 7/2001 | Nakanishi |
| 6,390,690 B1 | 5/2002 | Meis |
| 6,625,376 B2 | 9/2003 | Werkheiser |
| 6,632,023 B1 | 10/2003 | Ogawa |
| 7,066,657 B2 | 6/2006 | Murali |
| 7,213,974 B2 | 5/2007 | Kiani |
| 7,473,038 B2 | 1/2009 | Fujiwara |
| 7,534,052 B2 | 5/2009 | Fujiwara |
| 7,726,885 B2 | 6/2010 | Nishimura |
| 8,036,500 B2 | 10/2011 | McColloch |
| 8,165,432 B2 | 4/2012 | Ohta |
| 8,503,838 B2 | 8/2013 | Chen |
| 2003/0142896 A1 | 7/2003 | Kikuchi |
| 2003/0165291 A1 | 9/2003 | Bhagavatula |
| 2004/0021214 A1 | 2/2004 | Badehi |
| 2004/0067025 A1 | 4/2004 | Haraguchi |
| 2005/0238294 A1 | 10/2005 | Nagasaka |
| 2006/0239605 A1 | 10/2006 | Palen |
| 2010/0135618 A1 | 6/2010 | Howard |
| 2010/0272403 A1 | 10/2010 | Chen |
| 2011/0064358 A1 | 3/2011 | Nishimura |
| 2011/0317959 A1 | 12/2011 | Ohta |
| 2012/0063721 A1 | 3/2012 | Chen |
| 2012/0063725 A1 | 3/2012 | Meadowcroft |
| 2012/0134624 A1 | 5/2012 | Lin |
| 2012/0183256 A1 | 7/2012 | Shao |
| 2014/0064676 A1 | 3/2014 | McColloch |
| 2014/0193116 A1 | 7/2014 | Bylander |
| 2015/0219863 A1 | 8/2015 | Haase |
| 2015/0234126 A1 | 8/2015 | Haase |
| 2016/0209610 A1 | 7/2016 | Kurtz |
| 2016/0216450 A1 | 7/2016 | Englund |
| 2016/0320568 A1 | 11/2016 | Haase |

FOREIGN PATENT DOCUMENTS

| | | |
|---|---|---|
| WO | WO 2013-048730 | 4/2013 |
| WO | WO 2013-048743 | 4/2013 |
| WO | WO 2013-180943 | 12/2013 |
| WO | WO 2014-055226 | 4/2014 |
| WO | WO 2014-055360 | 4/2014 |
| WO | WO 2014-055361 | 4/2014 |
| WO | WO 2014-093046 | 6/2014 |

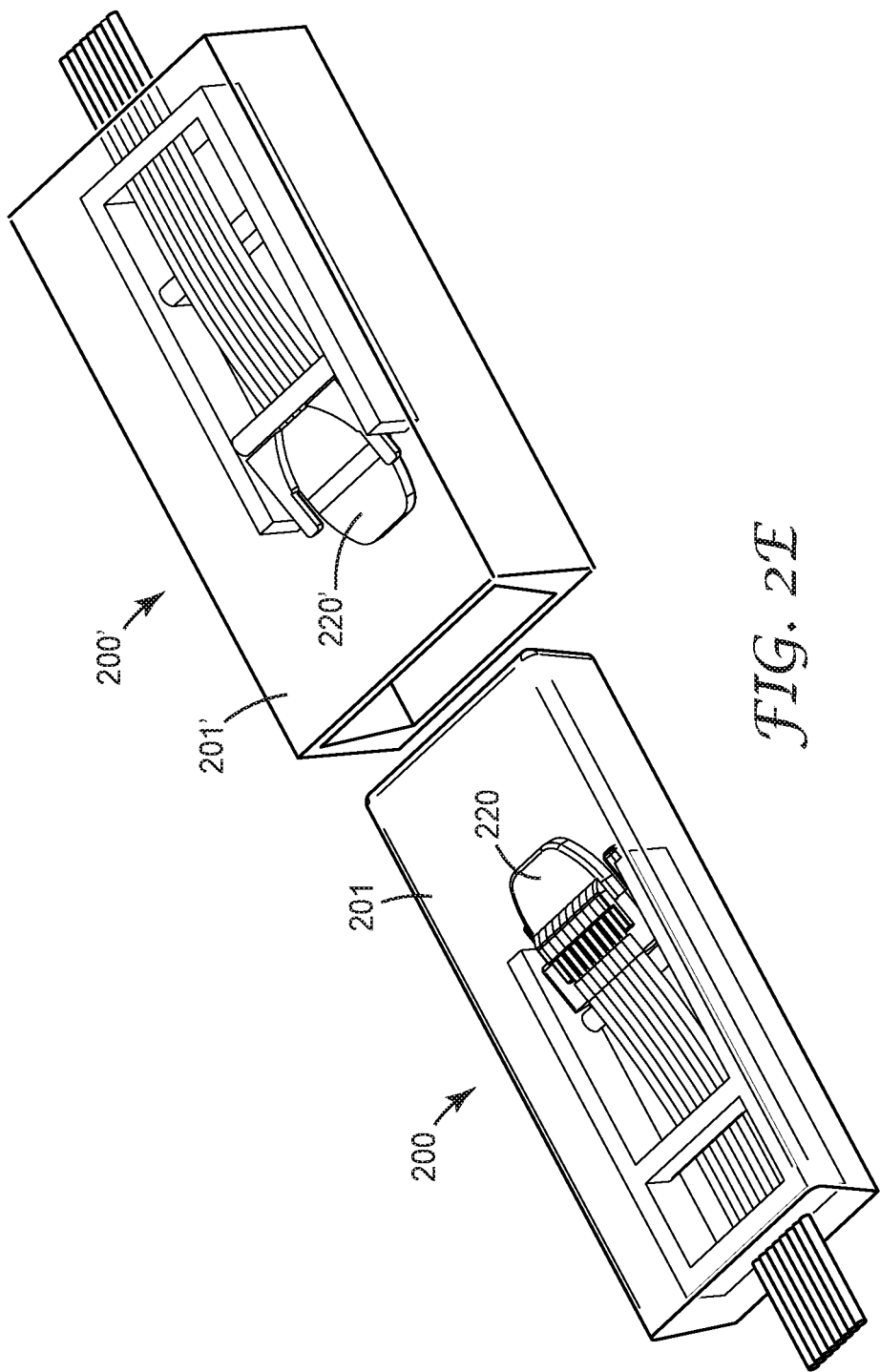

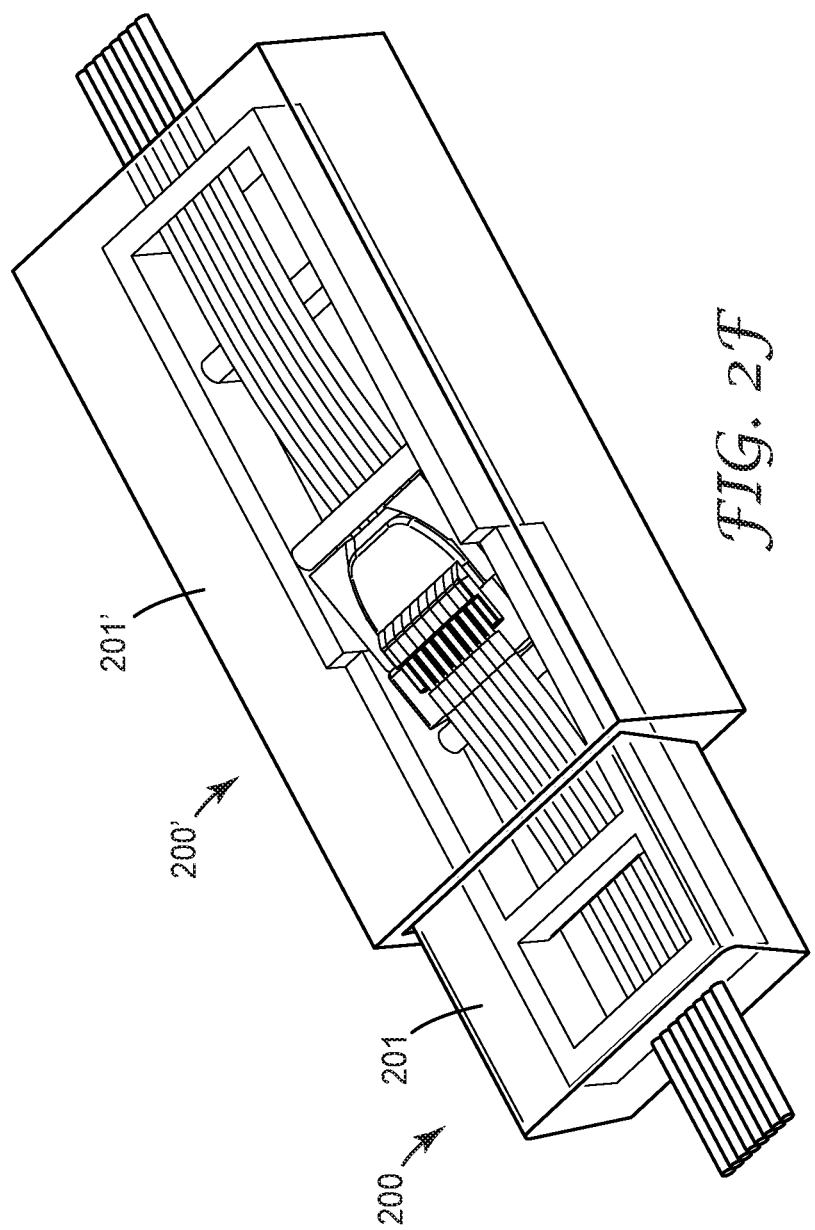

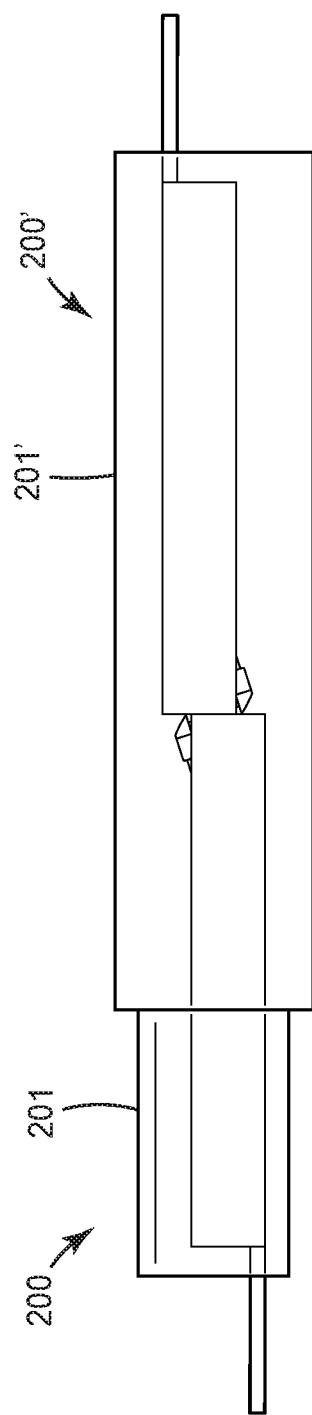

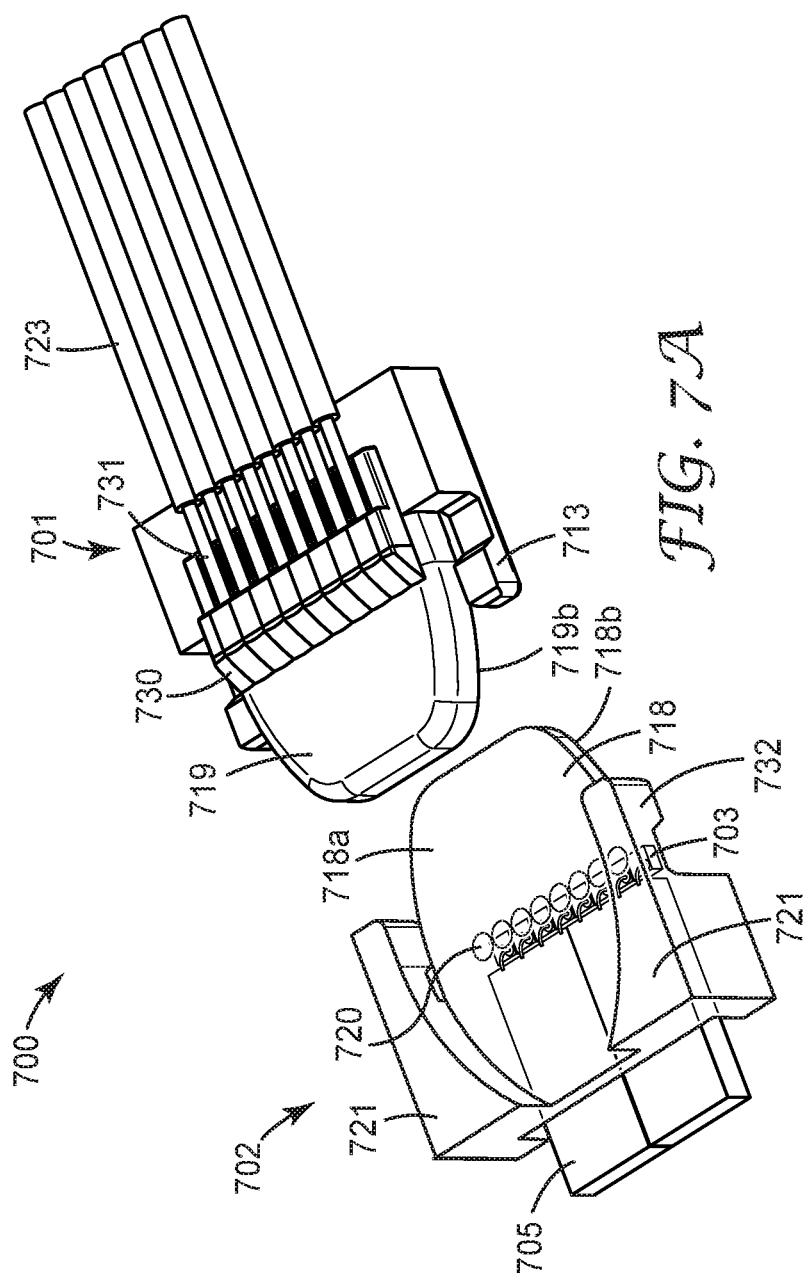

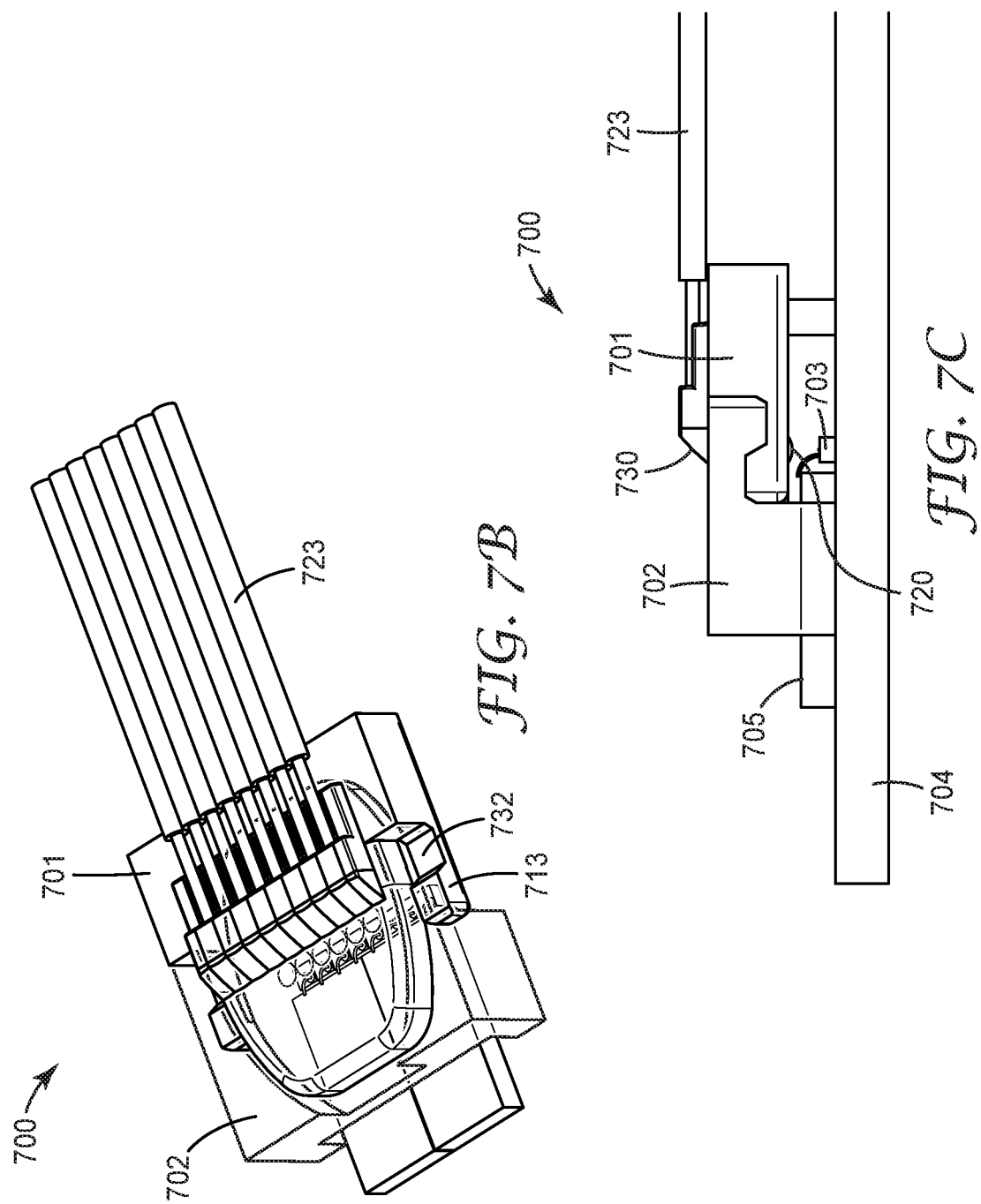

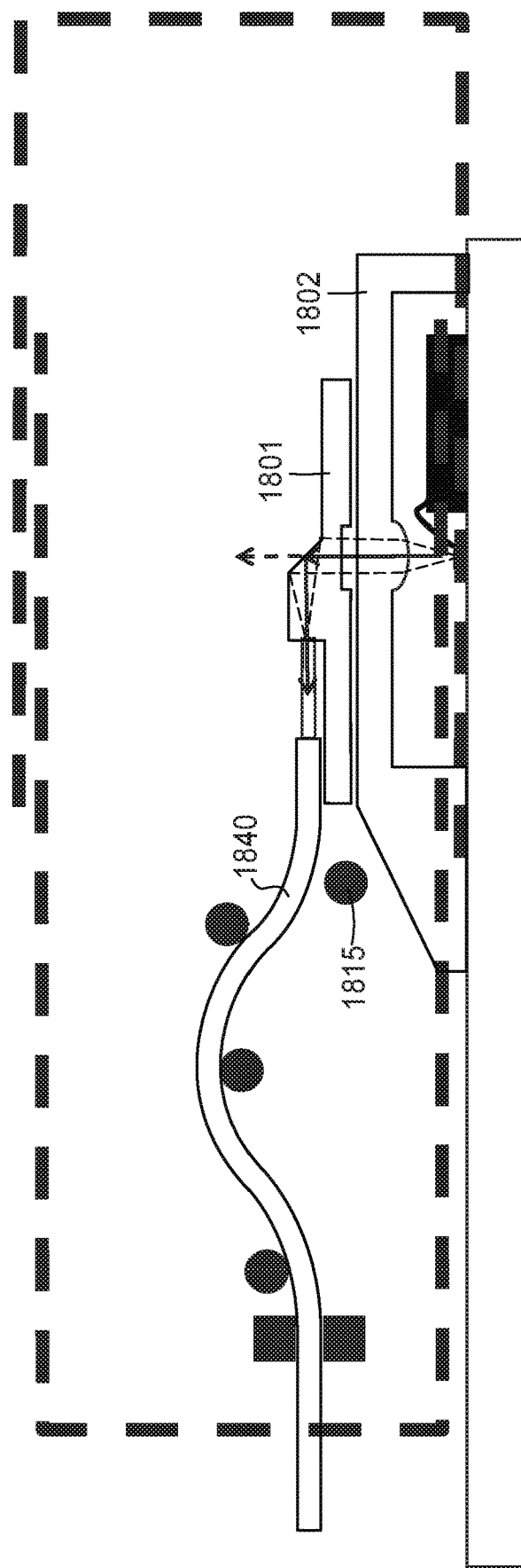

OPTICAL COMMUNICATION ASSEMBLIES

TECHNICAL FIELD

This disclosure relates generally to optical and optoelectronic assemblies and subassemblies configured to provide optical communication.

BACKGROUND

Optical communications involves the conversion of light to electricity and electricity to light. Optical and optoelectronic connectors can be used for optical communications in a variety of applications including telecommunications networks, local area networks, data center links, and for internal links in high performance computers. There is now interest in extending optical communication to applications inside smaller consumer electronic appliances such as laptops and even cell phones. Expanded beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

SUMMARY

Some embodiments are directed to an optical communication subassembly. The optical communications subassembly includes one or more optoelectronic devices and one or more optical elements. Each optical element has an input side configured to receive incoming light and an output side configured to output outgoing light and is configured to change a divergence of the outgoing light relative to a divergence of the incoming light. Each optical element is spaced apart from and optically aligned with a corresponding optoelectronic device. the optical communication subassembly further includes a transceiver light coupling unit. The transceiver light coupling unit has a mating surface configured for mating with a connector light coupling unit attached to an optical waveguide. A mating direction of the connector light coupling unit forms an angle with the mating surface of the transceiver light coupling unit such that when the connector light coupling unit mates with the transceiver light coupling unit, the angle between the mating direction of the connector light coupling unit and the mating surface of the transceiver light coupling unit causes the optical waveguide to bend.

Some embodiments are directed to an optical communication assembly. The optical communication assembly includes an optical connector comprising a connector light coupling unit. The connector light coupling unit is configured to couple light between a plurality of waveguides and a plurality of light redirecting elements. Each light redirecting element is optically coupled to a corresponding optical waveguide having a core diameter, the light redirecting element being configured to direct light emerging from the optical waveguide such that the directed light beam has a diameter greater than the core diameter of the optical waveguide. The optical communication assembly includes a plurality of optoelectronic devices configured to provide conversion between electrical energy and optical energy. The optical communication assembly includes a plurality of optical elements, each optical element configured to change a divergence of light passing through the optical element, each light redirecting element optically coupled to a corresponding optoelectronic device through a corresponding optical element. A transceiver light coupling unit is configured for mating with the connector light coupling unit and to couple light between the connector light coupling unit and the plurality of optoelectronic devices. A mating direction of the optical connector forms an angle with the mating surface of the transceiver light coupling unit such that when the connector light coupling unit mates with the transceiver light coupling unit, the angle between the mating direction of the optical connector and the mating surface of the transceiver light coupling unit causes the plurality of optical waveguides to bend.

In some embodiments, an optical communication assembly includes an optical connector comprising a connector light coupling unit, the connector light coupling unit configured to couple light between a plurality of waveguides and a plurality of light redirecting elements, each light redirecting element optically coupled to a corresponding optical waveguide having a core diameter, the light redirecting element being configured to direct light emerging from the optical waveguide such that the directed light beam has a diameter greater than the core diameter of the optical waveguide. A plurality of optoelectronic devices are configured to provide conversion between electrical energy and optical energy. The optical communication assembly includes a plurality of optical elements, each optical element configured to change a divergence of light passing through the optical element, each light redirecting element optically coupled to a corresponding optoelectronic device through a corresponding optical element. A transceiver light coupling unit is configured for mating with the connector light coupling unit and to couple light between the connector light coupling unit and the plurality of optoelectronic devices. The connector light coupling unit has a mating surface and the transceiver light coupling unit has a corresponding mating surface, such that when mating between the connector light coupling unit and the transceiver light coupling unit occurs, the mating surface of the connector light coupling unit initially makes line contact with the mating surface of the transceiver light coupling unit and then the connector light coupling unit rotates to make surface-to-surface contact with the transceiver light coupling unit, the rotation causing the plurality of optical waveguides to bend.

Some embodiments are directed to an optical communication assembly that includes an optical connector comprising a connector light coupling unit, the connector light coupling unit configured to couple light between a plurality of waveguides and a plurality of light redirecting elements, each light redirecting element optically coupled to a corresponding optical waveguide having a core diameter, the light redirecting element being configured to direct light emerging from the optical waveguide such that the directed light beam has a diameter greater than the core diameter of the optical waveguide. The optical communication assembly includes a plurality of optoelectronic devices and a plurality of optical elements. Each optical element is configured to change a divergence of light passing through the optical element. Each light redirecting element is optically coupled to a corresponding optoelectronic device through a corresponding optical element. A transceiver light coupling unit is configured for mating with the connector light coupling unit and to couple light between the connector light coupling unit and the plurality of optoelectronic devices. The connector light coupling unit has a mating surface with a mating edge and the transceiver light coupling unit has a corresponding mating surface with a beveled mating edge. The mating surfaces of the connector light coupling unit and the transceiver light coupling unit, after mating, are arranged substantially parallel to a mating direction of the optical connector, such that when mating occurs, the mating edge of the connector light coupling unit initially makes contact with the beveled mating edge of the transceiver light coupling unit and as the connector light coupling unit moves along the mating direction, the connector light coupling unit rotates to make surface-to-surface contact between the mating surface of the connector light coupling unit and the mating surface of the transceiver light coupling unit. The rotation causes the plurality of optical waveguides to bend.

Some embodiments involve an optical communication subassembly that includes a connector light coupling unit including a plurality of light redirecting elements. Each light redirecting element is optically coupled to a corresponding optical waveguide. The light redirecting element is configured to direct light traveling to or from the optical waveguide such that a central ray of light traveling to or from the optical waveguide is redirected by an angle, θ, greater than 90 degrees.

Some embodiments involve an optical communication subassembly that includes a connector light coupling unit configured to couple light between a plurality of waveguides and a plurality of reflective elements, respectively. Each reflective element is optically coupled to a corresponding optical waveguide. Each reflective element is configured to reflect input light to or from the optical waveguide such that a central ray of input light traveling to or from the optical waveguide is reflected at a first angle, θ. Each reflective element is further configured to change the divergence of the input light. The optical communications subassembly also includes a plurality of refractive elements, each refractive element is optically coupled to a corresponding reflective element, each refractive element configured to change a direction of light traveling to or from the corresponding reflective element by a second angle, φ.

Embodiments are directed to an optical communication assembly that includes one or more optoelectronic devices, one or more optical elements, each optical element aligned with a corresponding optoelectronic device, and a transceiver light coupling unit. The optical communication assembly further includes a connector light coupling unit comprising one or more light redirecting features. Each light redirecting feature is arranged to be optically coupled to a corresponding optical waveguide, wherein the transceiver light coupling unit is configured to mate with the connector light coupling unit so that each light redirecting feature is optically aligned with a corresponding optoelectronic device through a corresponding optical element. A cover is configured to apply force to the optical communication assembly to retain each light redirecting feature in optical alignment with the corresponding optoelectronic device.

Some embodiments of an optical communication assembly include first and second printed circuit boards (PCBs), the first PCB disposed on a surface of the second PCB. The first PCB having a hole, and the first and second PCBs arranged so that sides of the hole and the surface of the second PCB form a recess. The optical communications assembly includes a transceiver light coupling unit arranged on the first PCB and at least partially covering the recess. The optical communications assembly includes one or more optical elements and one or more optoelectronic devices disposed on the first PCB and within the recess. Each optoelectronic device is optically aligned with a corresponding optical element. The communications assembly includes a connector light coupling unit including one or more light redirecting elements, each light redirecting element arranged to be optically coupled to a corresponding optical waveguide, wherein the transceiver light coupling unit is configured to mate with the connector light coupling unit so that each light redirecting element is optically aligned with a corresponding optoelectronic device through a corresponding optical element. The assembly further includes a cover configured to apply force to the connector light coupling unit to retain each light redirecting element in optical alignment with the corresponding optoelectronic device.

In some embodiments, an optical communication assembly includes first and second printed circuit board (PCBs), the first PCB disposed on a surface of the second PCB. The first PCB has a hole, the first and second PCBs arranged so that sides of the hole and the surface of the second PCB form a recess. The optical communications assembly includes a transceiver light coupling unit arranged on the first PCB and at least partially covering the recess. The optical communication assembly further includes one or more optical elements and one or more optoelectronic devices disposed on the first PCB and within the recess. Each optoelectronic device is optically aligned with a corresponding optical element. Further included is a connector light coupling unit comprising one or more light redirecting elements, each light redirecting element is arranged to be optically coupled to a corresponding optical waveguide. The transceiver light coupling unit is configured to mate with the connector light coupling unit so that each light redirecting element is optically aligned with a corresponding optoelectronic device through a corresponding optical element. A clip is included to apply force to the connector light coupling unit in a direction substantially normal to a mating surface of the connector light coupling unit. The clip is configured to retain each light redirecting element in optical alignment with the corresponding optoelectronic device.

An optical communication assembly includes one or more optoelectronic devices and one or more optical elements, each optical element aligned with a corresponding optoelectronic device. The optical communications assembly further includes a transceiver light coupling unit having a mating surface and a connector light coupling unit having a mating surface configured to mate with the mating surface of the transceiver light coupling unit. The connector light coupling unit comprises one or more light redirecting elements, each light redirecting element arranged to be optically coupled to a corresponding optical waveguide. The transceiver light coupling unit is configured to mate with the connector light coupling unit so that each light redirecting element is optically aligned with a corresponding optoelectronic device through a corresponding optical element. One or more alignment holes extend through planes of the transceiver light coupling unit and the connector light coupling unit mating surfaces. The alignment holes are configured to receive alignment pins.

Some embodiments of an optical communication assembly include a frame disposed on a PCB. One or more optoelectronic devices are disposed on the PCB within the frame. The optical communications assembly includes one or more optical elements. Each optical element is optically coupled to a corresponding optoelectronic device and configured to change divergence of light passing through the optical element. The assembly further includes a light coupling unit comprising one or more light redirecting elements, each light redirecting element arranged to be optically coupled to a corresponding optical waveguide, wherein the frame is configured to hold the light coupling unit so that each light redirecting element is optically aligned with a corresponding optoelectronic device through a corresponding optical element.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIGS. 2E-2G provide views of optical connectors with external bodies over the housings, in accordance with some embodiments;

FIGS. 7A-7C illustrate portions of an optical communication assembly including a connector light coupling unit, a transceiver light coupling unit, optical elements, and optoelectronic components in accordance with some embodiments;

FIGS. 18A and 18B depict an expanded beam optical communication assembly in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
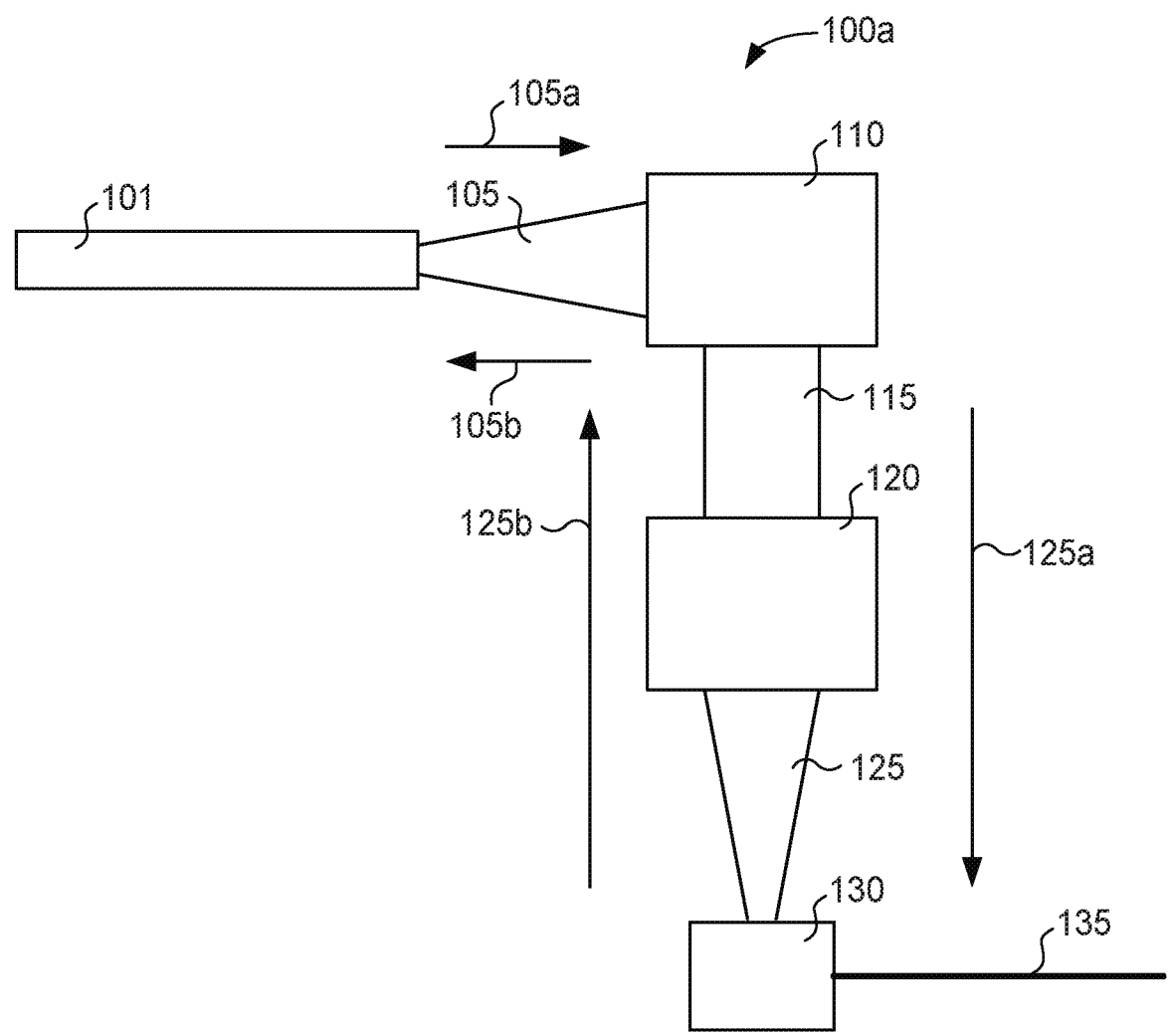
FIGS. 1A and 1B are block diagrams showing features of an optical communication assembly that uses expanded beam coupling according to some embodiments.
Figure 1B:
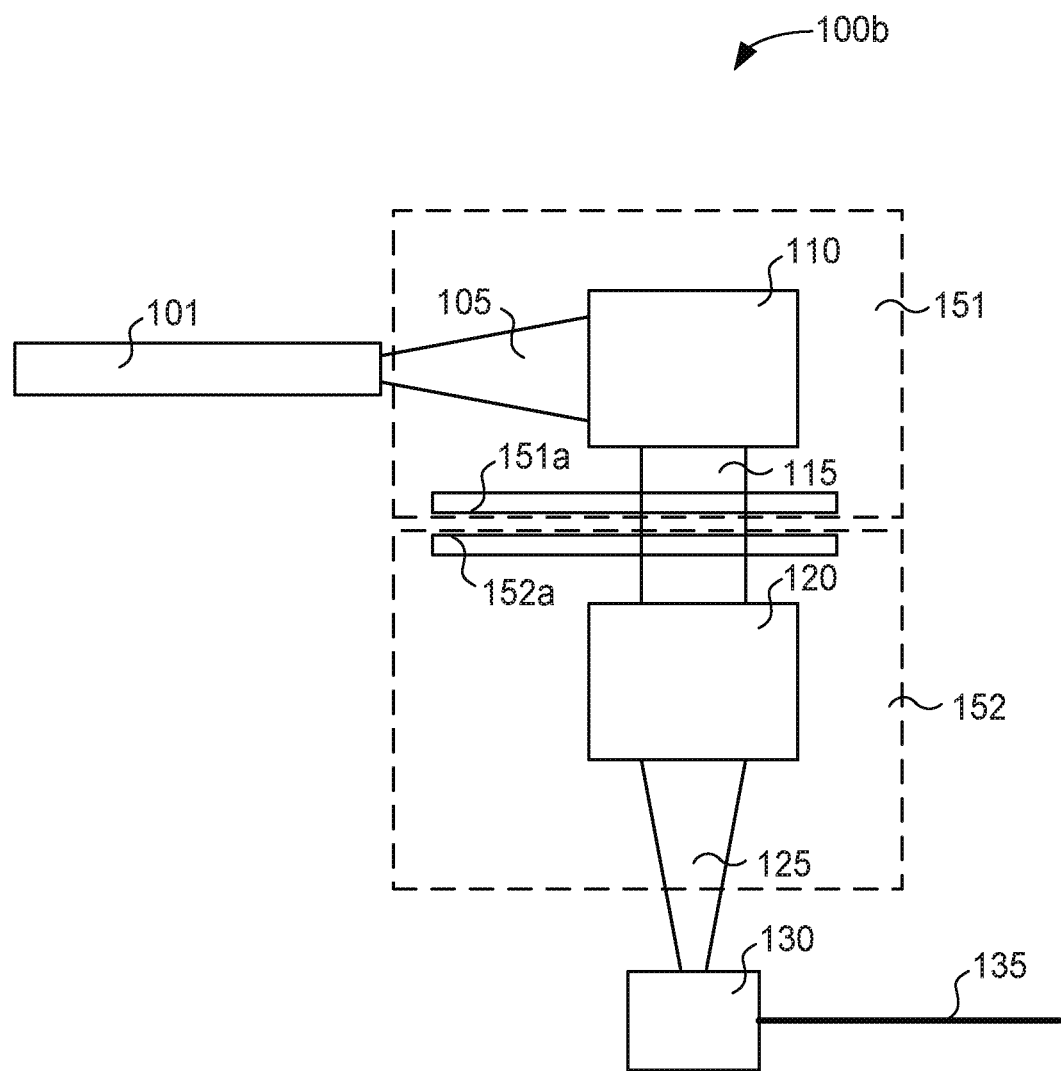

FIGS. 1A and 1B are block diagrams showing features of an optical communication assembly that uses expanded beam coupling. The optical communication assembly 100a can be configured to convert light to electricity and/or to convert electricity to light. The optical communication assembly includes a light redirecting element 110, a refractive element 120 and an optoelectronic device 130, which may be a photodetector or a light source such as a vertical cavity surface emitting laser (VCSEL). The light redirecting element 110 is optically coupled to the optoelectronic element 130 through refractive element 120.

For example, light traveling in an optical waveguide (e.g., an optical fiber) 101 can be converted to electricity by a photodetector 130. The waveguide 101 has a core size, and as the light beam 105 emerging from the waveguide 101 travels along direction 105a, the light beam 105 diverges to a diameter greater than the core size of the waveguide 101.

The expanded light beam 105 travels along direction 105a and encounters redirecting element 110. Redirecting element 110 reflects the expanded light beam 105 along direction 125a. The redirecting element 110 changes the divergence of the light beam 105 and may collimate the light beam 105; it may also change the direction of the light. Light beam 115 that emerges from the redirecting element travels along direction 125a and encounters refractive element 120. The refractive element 120 changes the divergence of the light beam 115. As shown in FIG. 1A, in the scenario in which light is converted to electricity, the optical element 120 changes the divergence of the light beam 115 to provide a light beam 125 that is focused onto an optoelectronic device 130 such as a photodetector. The photodetector 130 converts the focused light beam 125 to electricity which is carried by electrical cable 135.

In the scenario in which electricity is converted to light, an electrical signal, carried by electrical cable 135 activates the light emitting device 130 to emit light beam 125. The light beam 125 emitted by the optoelectronic device 130 diverges as it travels along direction 125b until it encounters optical element 120. Optical element 120 changes the divergence of light beam 125 and may collimate light beam 125. Light beam 115 emerges from the optical element 120 and encounters redirecting element 110. Redirecting element 110 changes the direction of light beam 115 so that it is traveling along direction 105b. The redirecting element 110 changes the divergence of the light beam 115 to provide a light beam 105 that is focused onto the optical waveguide 101.

FIG. 1B illustrates several optical communication subassemblies 151, 152 that form portions of optical communication subassembly 100b. As depicted in FIG. 1B, the optical communication assembly includes a connector light coupling unit 151 and a transceiver light coupling unit 152. In this example, the connector light coupling unit 151 includes the redirecting element 110 and a mating surface 151a. The transceiver light coupling unit 152 includes the refractive element 120 and a mating surface 152a. Various other arrangements of the connector light coupling unit and the transceiver light coupling unit are possible, for example, in some arrangements the connector light coupling unit may include both the redirecting and refractive elements; in other arrangements, the refractive element may be mounted on the optoelectronic device.

The connector light coupling unit 151 includes mating surface 151a which is configured to mate with a corresponding mating surface 152a of the transceiver light coupling unit 152. When the connector light coupling unit is mated to the transceiver light coupling unit, the redirecting element 110 is optically coupled to the optoelectronic device 130 through the refractive element 120. When connector and transceiver light coupling units 151, 152 are mated along their mating surfaces 151a, 152a, light emerging from the waveguide 101 is transferred through the connector light coupling unit 151, through the transceiver light coupling unit 152, and to the optoelectronic device 130. Alternatively, light emitted by the optoelectronic device 130 is transferred through the transceiver light coupling unit 152, through the connector light coupling unit 151, and to the waveguide 101.

Figure 2A:
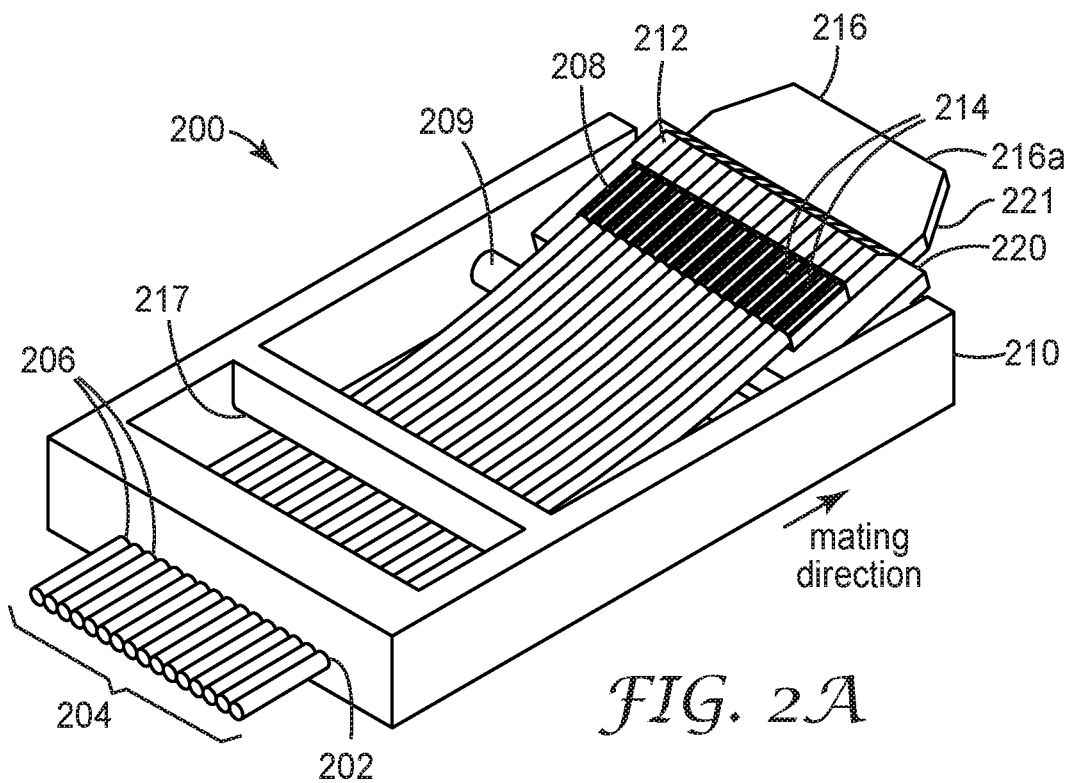
FIG. 2A shows an optical connector comprising a connector light coupling unit disposed in a housing in accordance with some embodiments.

FIG. 2A shows a connector light coupling unit 220 disposed in a housing 210, forming optical connector 200. The housing 210 has first attachment area 202. First attachment area 202 is the part of housing 210 where one or more optical waveguides, such as plurality of optical waveguides 204 (e.g. ribbon of optical fibers 204) shown in FIG. 2A first contacts housing 210 and, in the embodiment shown in FIG. 2A, passes through via holes 206 into the interior of housing 210. One or more optical waveguides 204 can be received and permanently attached to housing 210 where they contact housing 210 in via holes 206 and where they pass over, but are not permanently attached to, first waveguide support 209, which is disposed between first attachment area 202 and second attachment area 208. In other embodiments, first waveguide support 209 can directly contact and support, but not be permanently attached to connector light coupling unit 220. Second attachment area 208 includes a plurality of waveguide alignment members 214. Waveguide alignment members 214 can be configured to accommodate a different plurality of optical waveguides 204 than that received and permanently attached to first attachment area 202. In some embodiments, the optical waveguide can be bonded to first attachment area 202 at via hole 206 and/or to second attachment area 208 at alignment members 214. The first attachment area 202 can include a plurality of grooves (not shown in FIGS. 2A and 2B), each groove being configured to accommodate a different optical waveguide in a plurality of waveguides received and permanently attached at the first attachment area 202. Connector 200 also includes connector light coupling unit 220 having mating surface 221 that can mate with a transceiver light coupling unit as previously discussed.

The housing 210 can also include second waveguide support 217 disposed between first waveguide support 209 and the first attachment area 202 for supporting, but not being permanently attached to, an optical waveguide which can be permanently attached to the first and second attachment areas 202, 208, such that when the connector 200 mates with a mating connector, the optical waveguide further bends causing the optical waveguide to separate from the first support 209 and/or second support 217. In some embodiments, an optical waveguide that is permanently attached at the first and second attachment areas 202, 208 can be bent between the two attachment areas 202, 208 in a plane formed defined by the mating direction and the direction of light exit (output direction) from the connector light coupling unit 220. In some embodiments, an optical waveguide permanently attached at the first and second attachment areas 202, 208 can be bent between the two attachment areas 202, 208 in a plane perpendicular to an axis around which the connector light coupling unit 220 rotates during mating. In some embodiments, an optical waveguide that is permanently attached to the first and second attachment areas 202, 208 can be bent in a bend direction that lies in a plane parallel to a plane defined by the rotation of the optical coupling unit.

Connector light coupling unit 220 includes mechanical mating tongue portion 216, mating surface 221, interlocking mechanism 218, and second attachment area 208. The tongue portion 216 can have a tapering width along at least a portion of the length of the tongue portion and extends outwardly from the connector light coupling unit 220. When the connector light coupling unit 220 moves toward a mating light coupling unit, the tongue portion is guided in a corresponding tongue recess of the mating light coupling unit in such a way that a misalignment, such as a lateral misalignment, between the two light coupling unit is corrected. In some cases, when the connector light coupling unit 220 moves toward a mating light coupling unit, the first contact between the connector light coupling unit 220 and the mating light coupling unit is between the mating surface 221 of the tongue portion 216 of the connector light coupling unit 220 and the mating surface of the mating light coupling unit. In some cases, when the connector light coupling unit 220 moves toward a mating light coupling unit, the first contact between the connector light coupling unit 220 and the mating light coupling unit is a line contact between the mating edge 216a of the tongue portion 216 of the connector light coupling unit 220 and the mating surface of the mating light coupling unit.

Figure 2B:
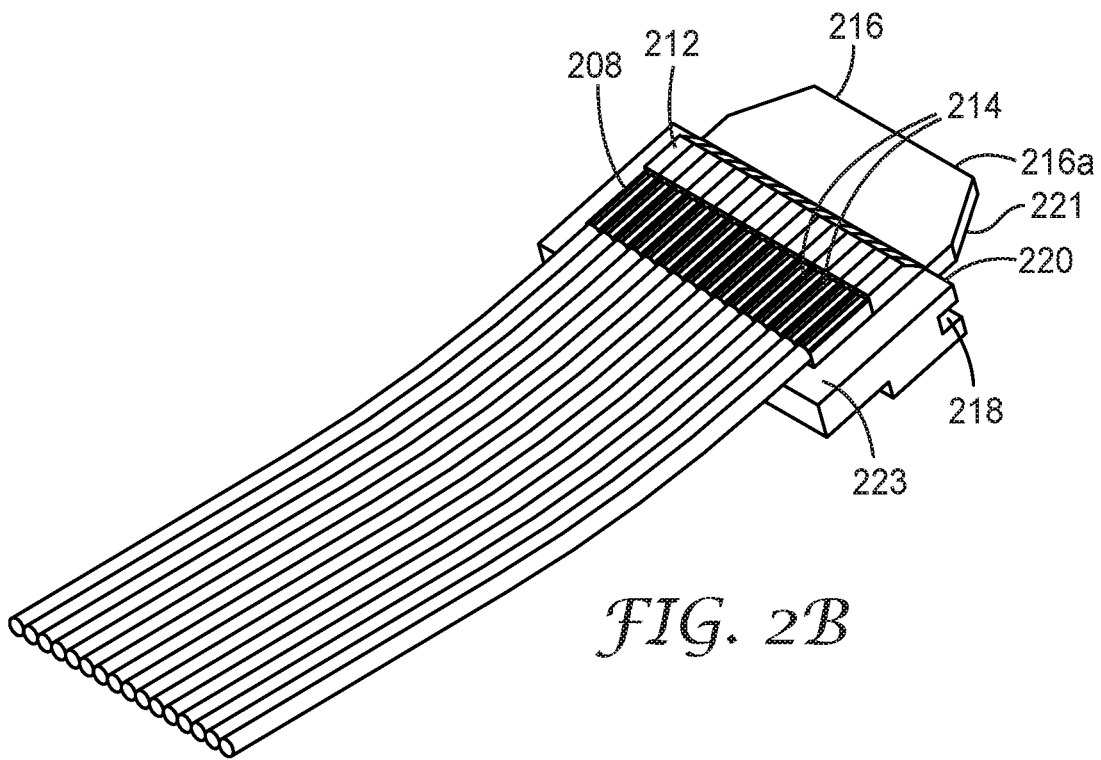
FIG. 2B shows the connector light coupling unit of FIG. 2A, without the housing according to some embodiments.
Figure 2C:
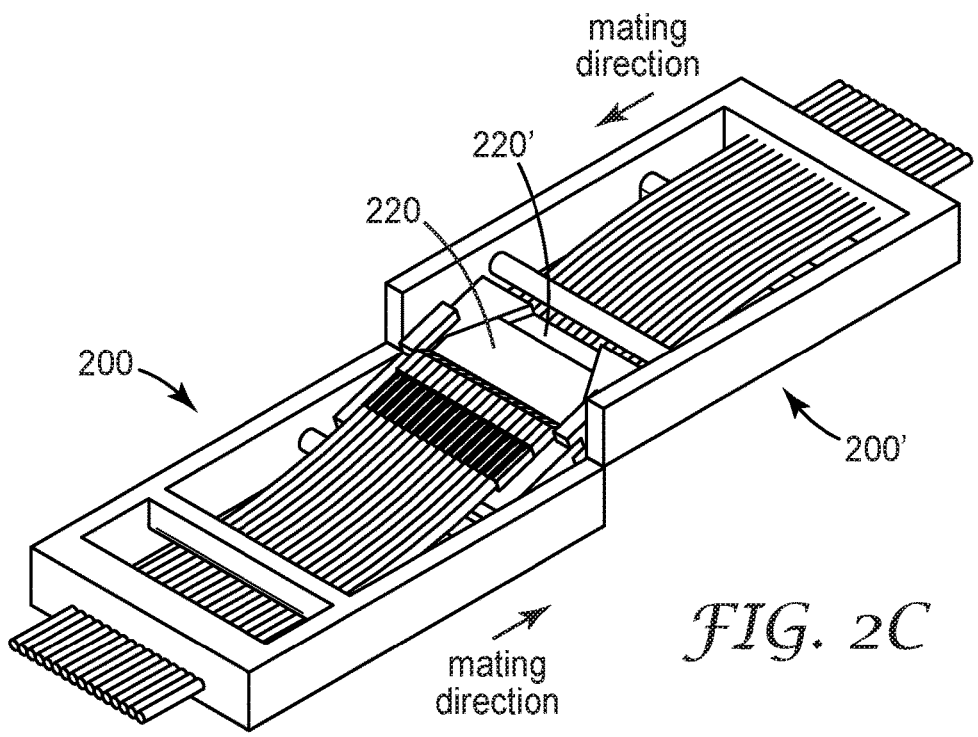
FIGS. 2C-2D provide views of optical connectors with housings in accordance with some embodiments.
Figure 2D:
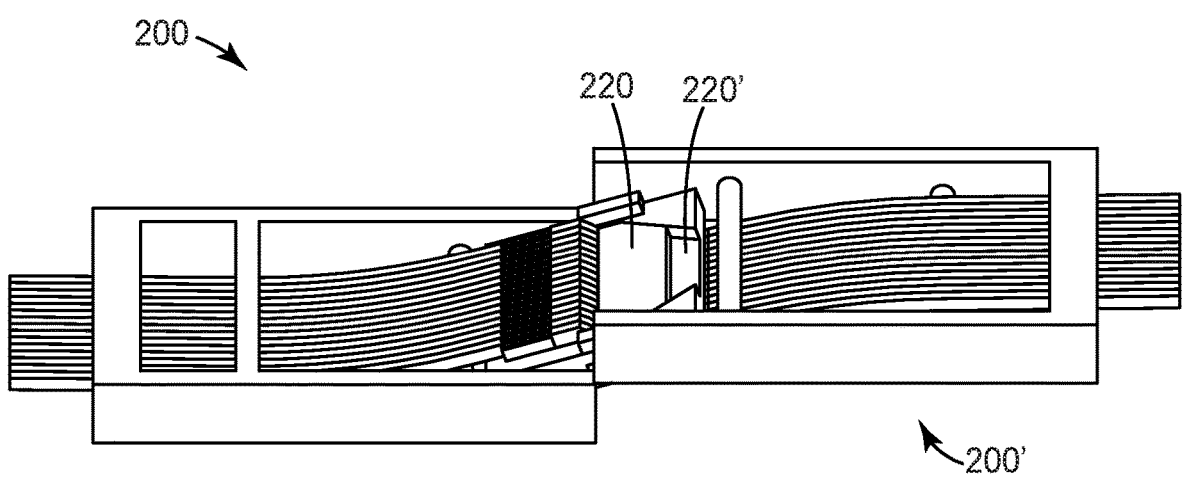

Features of the connector light coupling unit 220 may be more easily seen in FIG. 2B where housing 210 has been removed. Second attachment area 208 includes plurality of V-grooves 214 each groove being configured to accommodate a different optical waveguide in a plurality of optical waveguides received and permanently attached at the first attachment area 202, the optical waveguide being bonded to the second attachment area 208 at the groove 214. In some embodiments, the second attachment area 208 can permanently attach to a plurality of optical waveguides received and permanently attached at the first attachment area 202. In some embodiments, the optical waveguides are attached at the first attachment area 202, the second attachment area 208, or both, using an adhesive. In cases where the optical waveguides are optical fibers, the fiber attachment areas may consist of cylindrical holes into which the fibers are bonded. Also in cases where the waveguides are optical fibers, the polymer coating of the fiber may be bonded to a buffer attachment area 223 adjacent to the area 208 where the bare fiber is bonded, in order to enhance the mechanical strength of the assembly.

Light coupling unit 220 is configured so as to be able to move within housing 210. This facilitates proper alignment of light coupling unit 220 with a mating light coupling unit as will be shown in subsequent drawings.

FIGS. 2C through 2G are perspective views of two connectors similar to the connector shown in FIG. 2A. In the illustrated embodiment, the two connectors include first connector 200 (shown as positioned in FIG. 2A) and first mating connector 200' that is oriented upside down and reversed right to left from first connector 200. The two connectors 200, 200' are shown in a mated configuration in FIGS. 2C and 2D. First connector 200 and first mating connector 200' are mechanically interlocked with coupling members 218 shown in FIG. 2B.

FIGS. 2E through 2G show connectors 200 and 200' disposed within casings 201, 201'. FIG. 2E is a perspective view of connectors 200, 200' before mating, FIG. 2F is a perspective view of connectors 200, 200' after mating, and FIG. 2G is a side view of connectors 200, 200' after mating. The connector bodies 201, 201' provide rough alignment of the connectors 200, 200' so the light coupling units 220, 220' are close enough to accommodate the remaining misalignment. The casings 201, 201' may be configured to retain the connection between the light coupling units 220, 220', may provide protection against dirt and/or other contaminants, and/or may provide a surface for attachment to boards, bulkheads, etc. Additionally, the connector bodies 201, 201' can be configured to include a surface that allows gripping of the casing by a human without damage to the connector.

Figure 3A:
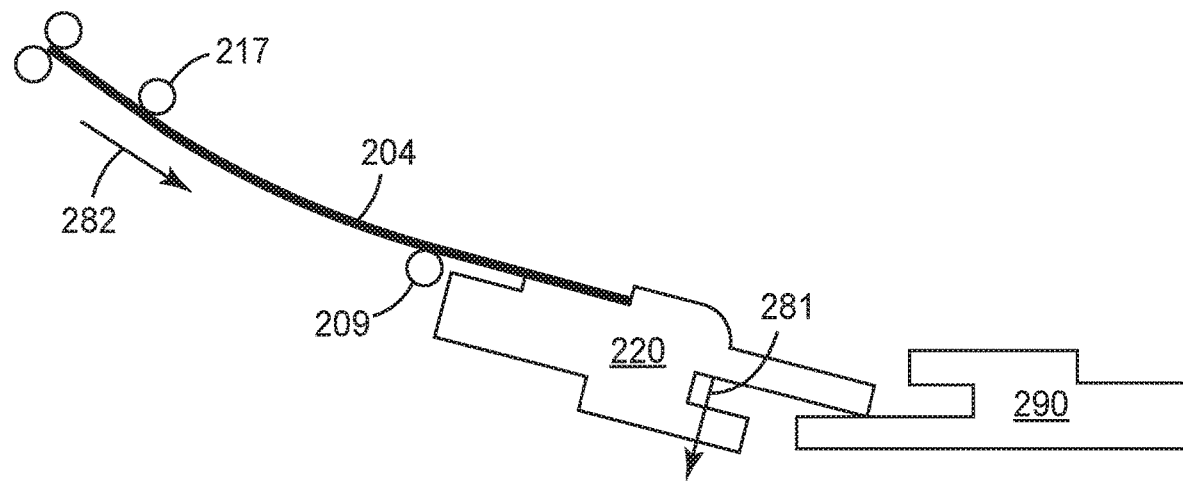
FIGS. 3A-3C illustrate mating a transceiver light coupling unit with a connector light coupling unit, wherein the connector light coupling unit moves causing the optical waveguide to bend according to some embodiments.
Figure 3B:
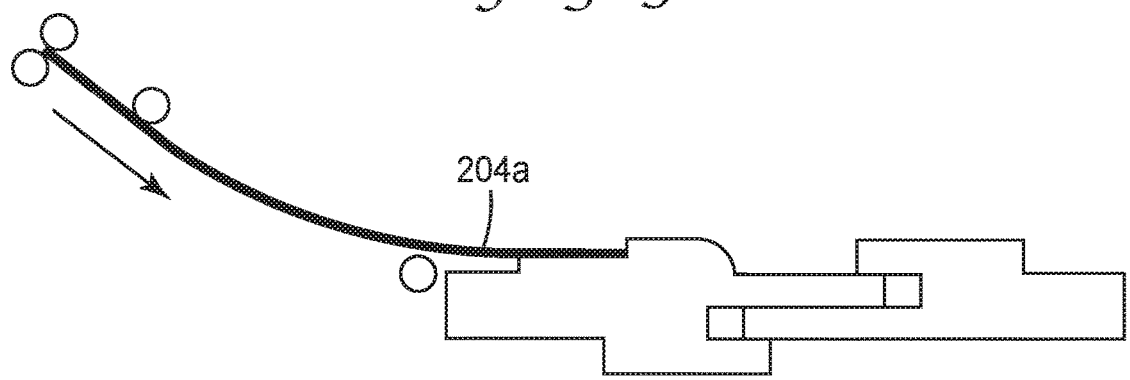
Figure 3C:
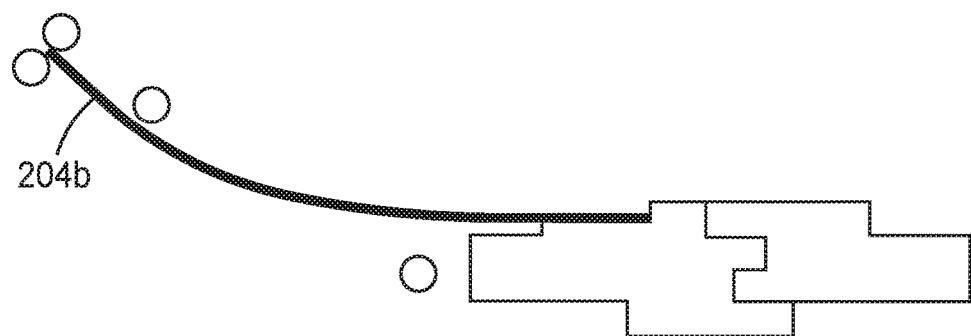

As shown in FIGS. 3A-3C, during mating with a mating transceiver light coupling unit 290, the connector light coupling unit 220 can move, causing the optical waveguide 204 to further bend with a first additional bend 204a resulting in the optical waveguide 204 separating from the first support 209. As the two mating light coupling units 220, 290 further engage (for example, in order to cause mechanical interlocking) a second additional bend 204b can result that causes the optical waveguide 204 to separate from the second support 217. The movement of the light coupling unit 220 can cause the light coupling unit 220 to make contact with a corresponding mating light coupling unit.

In some embodiments, as shown in FIG. 3A, light from the optical waveguide 204 can exit the connector in an exit direction 281 that is different than the mating direction 282 of the connector light coupling unit 220. In some embodiments, the optical waveguide is bent in a plane formed by the mating 282 and light exit 281 directions. In some embodiments, the connector light coupling unit 220 and/or the mating transceiver light coupling unit 290 can be a unitary construction meaning that the light coupling unit does not have any internal interfaces, joints, or seams. In some cases, a unitary structure or construction is capable of being formed in a single forming step such as machining, casting, or molding.

In some embodiments, the light coupling unit can include a light redirecting element. For example, when the optical waveguide is used to transmit light from the optical waveguide to an optoelectronic device, the light emerging from the waveguide along a first direction enters the light redirecting element, is redirected by the light redirecting element along a second direction that is different from the first direction, and exits the light redirecting element along the second direction. In some embodiments, the light redirecting element can have the same index of refraction, which is greater than one, between the input and output sides. The light redirecting element can include a plurality of reflective surfaces, e.g., a plurality of curved reflective surfaces. The light redirecting element can be configured to change the divergence of the light, e.g., the light redirecting element may collimate the light.

Figure 4A:
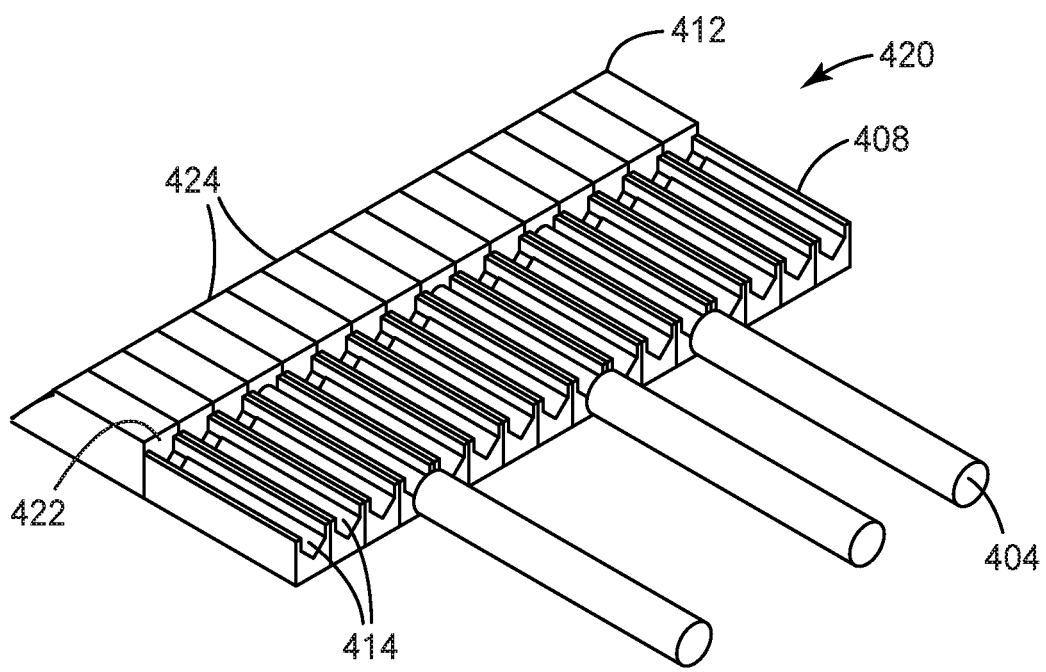
FIGS. 4A and 4B are perspective views of a portion of a connector light coupling unit including the first waveguide alignment members and light redirecting elements in accordance with some embodiments.
Figure 4B:
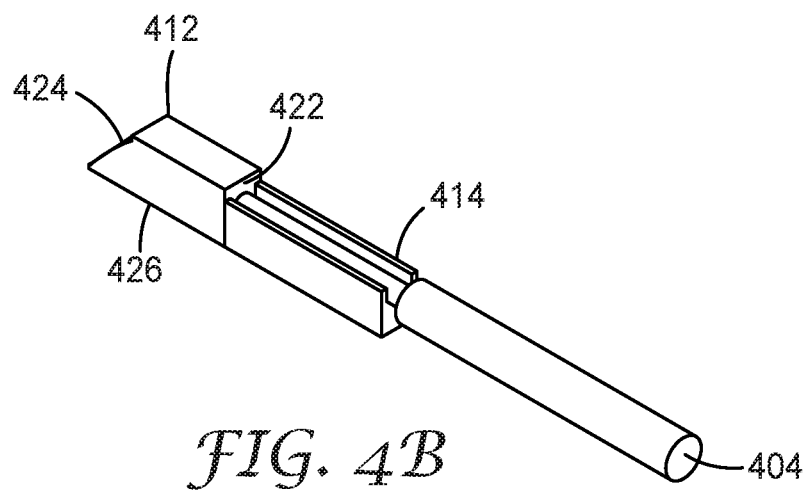

FIGS. 4A and 4B are perspective views of a portion of a connector light coupling unit 420 including the first waveguide alignment members 408 and light redirecting elements 412. The operation of the connector light coupling unit 420 is described in the scenario wherein the connector light coupling unit 420 receives light emerging from the optical waveguide 404 and redirects the light to an optoelectronic device (not shown). It will be appreciated that the connector light coupling unit may be operated in the scenario wherein the connector light coupling unit receives light emitted by the optoelectronic device and redirects the light to the optical waveguide 404. FIG. 4A is a perspective view of a portion of the light coupling unit 420 and light redirecting elements 412 illustrating the attachment of several optical fibers 404 to light coupling unit 420. Optical waveguides 404 are aligned in grooves 414, typically V-grooves, to which they may be permanently attached. Light coupling unit 420 includes an array of light redirecting elements 412, one for each optical fiber 404 attached to light coupling unit 420. Each optical fiber 404 is situated so as to be able to direct light emerging from the optical waveguide into a first side 422 or face of light redirecting element 412. In some embodiments, the light redirecting portion 424 of light redirecting element 412 comprises a reflective surface, a reflective lens, and/or a prism.

FIG. 4B is a perspective view of a portion of a connector light coupling unit that shows one light directing element 412, one first waveguide alignment member, e.g. V-groove 414, and one optical fiber 404. In this illustration, optical fiber 404 is aligned in V-groove 414 and may be permanently attached to it. At the point of attachment, the fiber buffer and protective coating (if any) have been stripped away to allow only the bare optical fiber to lie aligned and permanently affixed to V-groove 414. Light redirecting element 412 includes first side 422 for receiving input light from optical waveguide 404 disposed and aligned at first waveguide alignment member 414. Light redirecting element 412 also includes light redirecting portion 424 for receiving light from the first side 422 along an input direction and redirecting the light along a different redirected direction. The light redirecting element 412 also includes second side 426 that receives light from light redirecting portion 424 of light redirecting element 412 and transmits the received light as output light along an output direction. In some cases, at least one of the first side 422, light redirecting portion 424, and the second side 426 of the light redirecting element includes one or more curved surfaces for changing a divergence of light that exits optical waveguide 404. In some embodiments, such as when a curved surface is part of the light redirecting portion 424, the curved surfaces can be part of a curved mirror or a light reflecting lens. In some embodiments, such as when the curved surfaces are part of the second side 426, the curved surfaces can be light transmitting lenses. In some embodiments, each curved surface can be configured to collimate light from an optical waveguide corresponding to the curved surface.

Each optical waveguide 404 has a first core diameter. The corresponding redirecting element for each optical waveguide can be configured to change the divergence of light emerging from the optical waveguide such that light emanating from the optical waveguide exits the connector light coupling unit propagating along an exit direction that is different from the mating direction of the connector light coupling unit. The emanating light may be an expanded beam having a second diameter greater than the first core diameter due to the interaction of the light with the light redirecting element, e.g., a curved surface of the light redirecting element. In some embodiments, the ratio of the second diameter to the waveguide core diameter can be at least 2, at least 3.7, or even at least 5.

Figure 5:
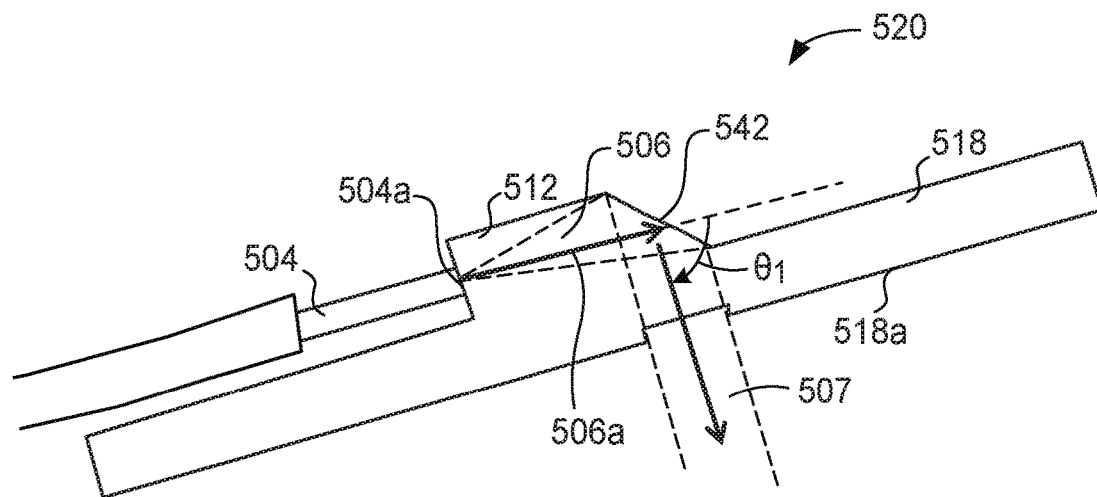
FIG. 5 is a cutaway side view of a connector light coupling unit wherein the light redirecting portion is configured to redirect the central ray of the light beam by an angle of about 90 degrees in accordance with some embodiments.

FIG. 5 is a cutaway side view of a connector light coupling unit 520 in accordance with some embodiments. Light beam 506 emanating from the end 504*a* of optical waveguide 504 is coupled into light redirecting element 512. Light redirecting element 512 includes light redirecting portion 542 that may comprise or be a curved light reflecting mirror or lens. The light beam 506 expands in diameter as it propagates toward the light redirecting portion 542 until the light beam 506 is redirected by portion 542. In the example shown in FIG. 5, the light redirecting portion 542 is configured to redirect the central ray 506*a* of the light beam 506 by an angle $\theta_1$, where $\theta_1$ is equal to about 90 degrees. After the redirection, light beam 507 propagates along a second direction different from the direction of light beam 506. In some cases the light redirecting element 512 changes the divergence of light passing through the light redirecting element 512 such that the divergence of light beam 506 is different from the divergence of light beam 507. In some implementations, the light redirecting element 512 may be configured to collimate light entering the light redirecting element 512. Mechanical coupling member 518 includes a mating surface 518*a* that is configured to mate with a corresponding mating surface of a transceiver light coupling unit.

Figure 6:
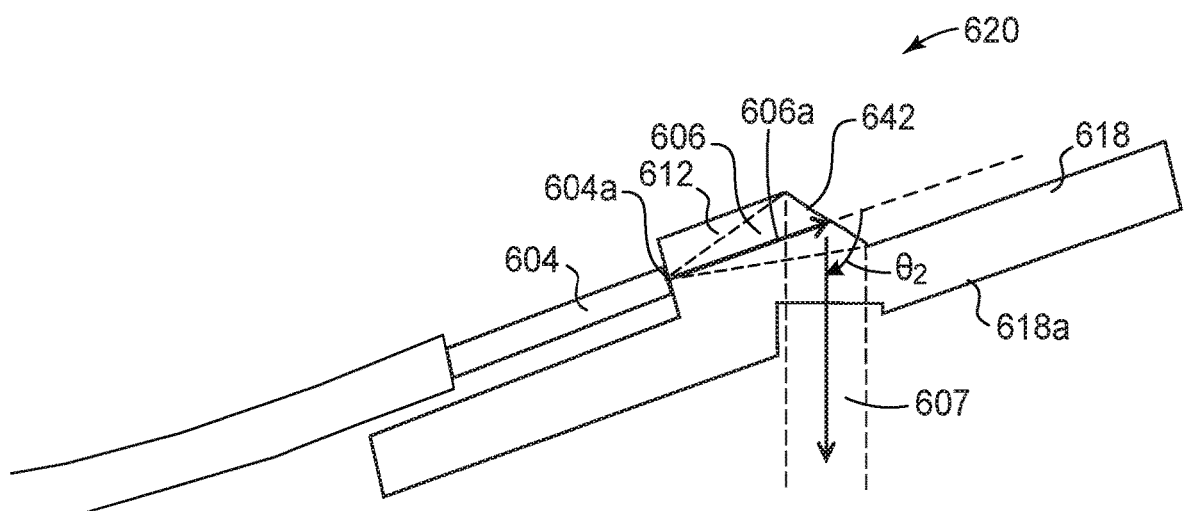
FIG. 6 is a cutaways side view of a connector light coupling unit wherein the light redirecting portion is configured to redirect the central ray of the light beam by an angle greater than 90 degrees in accordance with some embodiments.

FIG. 6 is a cutaway side view of a connector light coupling unit 620 in accordance with some embodiments. Light beam 606 emanating from the end 604*a* of optical waveguide 604 is coupled into light redirecting element 612. Light redirecting element 612 includes light redirecting portion 642 that may comprise or be a curved light reflecting mirror, a lens, and/or a prism. The light beam 606 expands in diameter as it propagates toward the light redirecting portion 642 until the light beam 606 is redirected by portion 642. In the example shown in FIG. 6, the light redirecting portion 642 is configured to redirect the central ray 606*a* of the light beam 606 by an angle $\theta_2$, where $\theta_2$ is greater than 90 degrees. After the redirection, light beam 607 propagates along a second direction different from the direction of light beam 606. In some cases the light redirecting element 612 changes the divergence of light passing through the light redirecting element 612 such that the divergence of light beam 606 is different from the divergence of light beam 607. In some implementations, the light redirecting element 612 may be configured to collimate light entering the light redirecting element 612. Mechanical coupling member 618 includes a mating surface 618*a* that is configured to mate with a corresponding mating surface of a transceiver light coupling unit.

When the connector light coupling unit is operating as a receiver, after redirection, the redirected light may travel substantially normal to the input face of the photodetector. When the connector light coupling unit is operating as a transmitter, prior to redirection, the light may travel substantially perpendicular to the output face of the semiconductor laser. In either case, the redirection of light by more than 90 degrees may cause the optical waveguide to point down toward the surface of a printed circuit board (PCB) containing the optoelectronic device, which, unless taken into account, can cause interference with other components on the PCB. However, the redirection of more than 90 degrees provides more efficient coupling and lower optical loss.

FIGS. 7A-7C illustrate portions of an optical communication assembly 700 including an connector light coupling unit 701, a transceiver light coupling unit 702, and optoelectronic components 703 disposed on a PCB 704 (shown only in FIG. 7C). Also shown in FIGS. 7A-7C are integrated circuits 705 mounted on the PCB 704 and electrically coupled, e.g., wire bonded, to the optoelectronic components 703. As shown in FIG. 7A, for example, the integrated circuits 705 are disposed to the left of the optoelectronic components 703. In other embodiments, the integrated circuits 705 may be disposed to the right of the optoelectronic components 703. The optoelectronic components 703 may comprise photodetectors configured to receive light from the optical elements of the 720 of the transceiver light coupling unit 702 or may comprise semiconductor laser devices, e.g., VCSELs, configured to emit light toward optical elements 720 of the transceiver light coupling unit 702. If the optoelectronic devices 703 are photodetectors, the integrated circuits 705 may comprise receiver circuitry configured to receive electrical signals from the photodetectors. If the optoelectronic devices 703 are light emitting devices, the integrated circuits 705 may comprise driver circuitry configured to transmit electrical signals to the light emitting devices.

As shown in FIG. 7A, the transceiver light coupling unit 702 includes a mechanical coupling member 718 which is supported by the PCB 704. The mechanical coupling member 718 includes a mating surface 718*a* and an opposing surface 718*b*. Optical elements 720 are disposed on the opposing surface 718*b* of the mechanical coupling member 718, each optical element 720 optically aligned with a corresponding optoelectronic device 703. The mechanical coupling member 718 supports the optical elements 720, such that there is an appropriate separation between the optoelectronic devices 703 and the optical elements 720, and also vertical alignment between the optical elements 720 and the optoelectronic devices 703.

The mating surface 718*a* of the mechanical coupling member 718 is configured to mate with a corresponding mating surface 719*b* of the mechanical coupling member 719 of connector light coupling unit 701. The connector light coupling unit 701 includes V-grooves 731 configured to hold a plurality of optical waveguides 723. Each light redirecting element 730 is optically aligned with a corresponding optoelectronic device 703 through corresponding optical element 720 when the connector light coupling unit 701 and the transceiver light coupling unit 702 are mated along their mating surfaces 718a, 719b.

The mechanical support member 718 of the transceiver light coupling unit 702 includes first and second alignment features 721 disposed on the mating surface 718a of the mechanical support member 718. The alignment features are shaped to correspond to the tapered shape of the mechanical support member 719 of the connector light coupling unit 701. The connector light coupling unit 701 may also include first and second alignment features disposed on the mating surface 719b of the mechanical support member 719, however, these features are not shown in FIG. 7. If present, the alignment features may be shaped to correspond to the tapered shape of the mechanical support member 718 of the transceiver light coupling unit 702. The connector light coupling unit 701 includes interlock features 713 configured to interlock with compatible interlock features 732 of the transceiver light coupling unit.

Figure 8A:
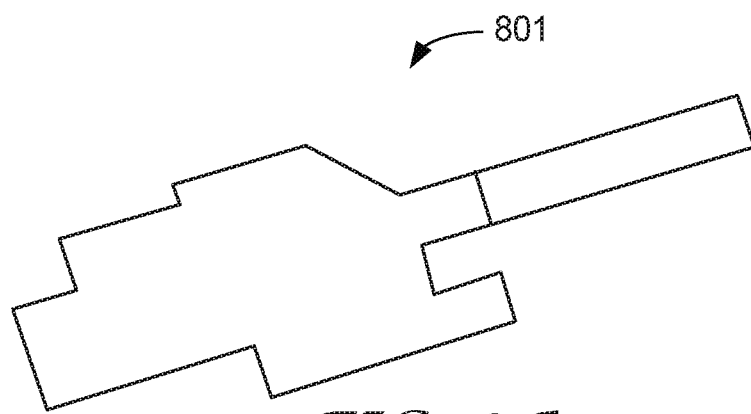
FIGS. 8A-8B depict a connector light coupling unit and a transceiver light coupling unit, respectively.
Figure 8B:
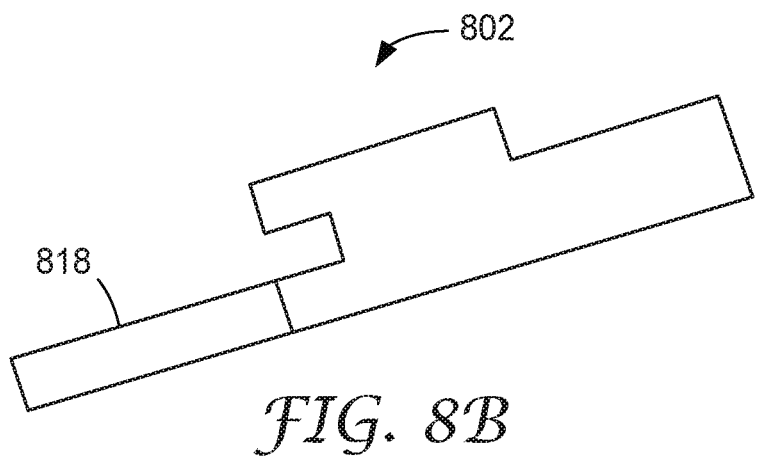
Figure 8C:
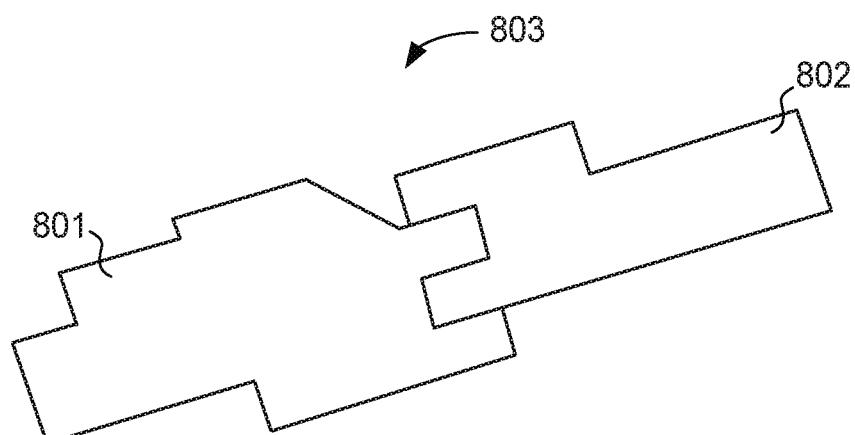
FIG. 8C depicts an optical communication assembly that includes the connector light coupling unit of FIG. 8A mated with a transceiver light coupling unit of FIG. 8B.

FIGS. 8A-8C depict a connector light coupling unit 801, a transceiver light coupling unit 802, and an optical communication assembly 803 that includes an connector light coupling unit 801 mated with a transceiver light coupling unit 802, respectively. FIG. 8C shows the optical and transceiver light coupling units mated with mechanical support structures interlocked by interlocking features. When the optical and transceiver light coupling units are mated, the optical communication assembly 803 allows light to pass through the assembly 803.

In some embodiments, when the connector light coupling unit 801 mates with a transceiver light coupling unit 802, the transceiver light coupling unit 802 is substantially stationary and the connector light coupling unit 801 can rotate at least 0.5 degrees. In some embodiments, when the connector light coupling unit 801 mates with a transceiver light coupling unit 802, the connector light coupling unit 801 can rotate at least 2.0 degrees. In some embodiments, when the connector light coupling unit 801 mates with a transceiver light coupling unit 802, the connector light coupling unit 801 can rotate at most 90 degrees.

In some embodiments, the mating direction of an optical connector that includes the connector light coupling unit 801 forms an oblique angle with the mating surface 818 of the transceiver light coupling unit 802. This oblique angle causes the optical fiber attached to the connector light coupling unit 801 of the optical connector to bend, as discussed above.

Figure 9:
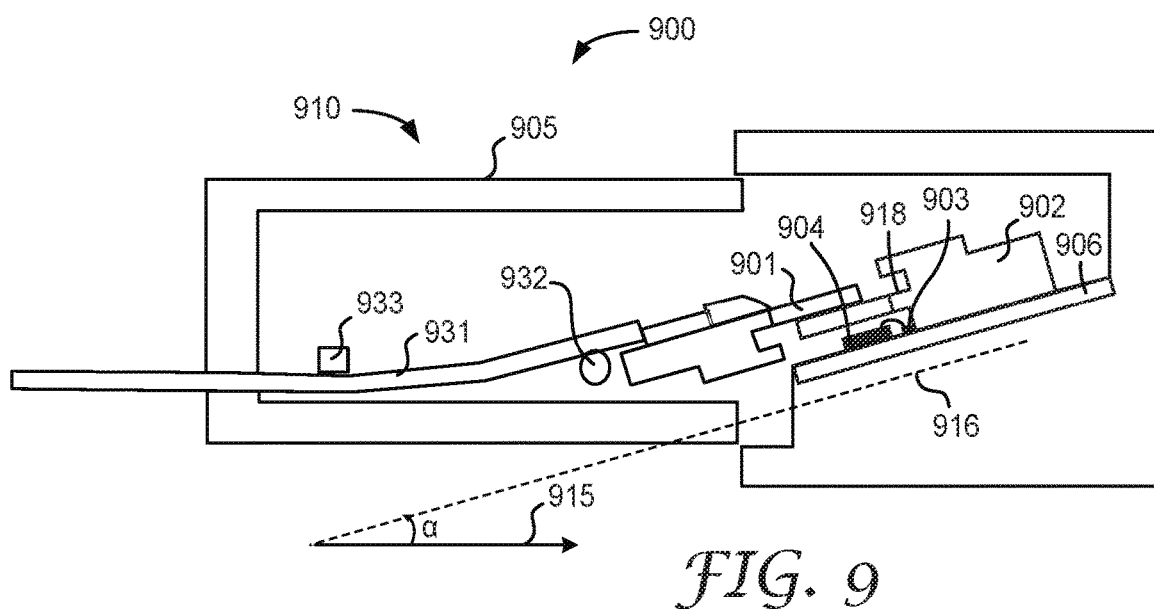
FIGS. 9-10 illustrate optical communication assemblies in accordance with some embodiments.

FIG. 9 illustrates an optical communication assembly 900 that includes an optical connector 910 comprising a body 905 and a connector light coupling unit 901, a transceiver light coupling unit 902, and optoelectronic devices 903. Also shown in FIG. 9 are integrated circuits 904 wire bonded to the optoelectronic devices 903. The transceiver light coupling unit 902, optoelectronic devices 903, and integrated circuits 904 are disposed on PCB 906. The mating direction 915 of the optical connector 910 is the direction that the connector body 905 moves to mate the optical and transceiver light coupling units 901, 902. The transceiver light coupling unit 902 has a mating surface 918 that is at an angle with respect to the mating direction 915 of the optical connector 910. Line 916 is parallel to mating surface 918. The angle, α, between the mating direction 915 of the optical connector 910 and the mating surface 918 of the transceiver light coupling unit 902 may be from about 5 to about 60 degrees, or about 10 to about 30 degrees, or about 15 degrees, for example. When mating occurs between the connector light coupling unit 901 and the transceiver light coupling unit 902, the difference between the mating direction of the optical connector 915 and the mating surface of the transceiver light coupling unit 918 causes the optical waveguide 931 to bend, moving the optical waveguide 931 away from one or both of the first and second waveguide supports 932, 933.

Figure 10:
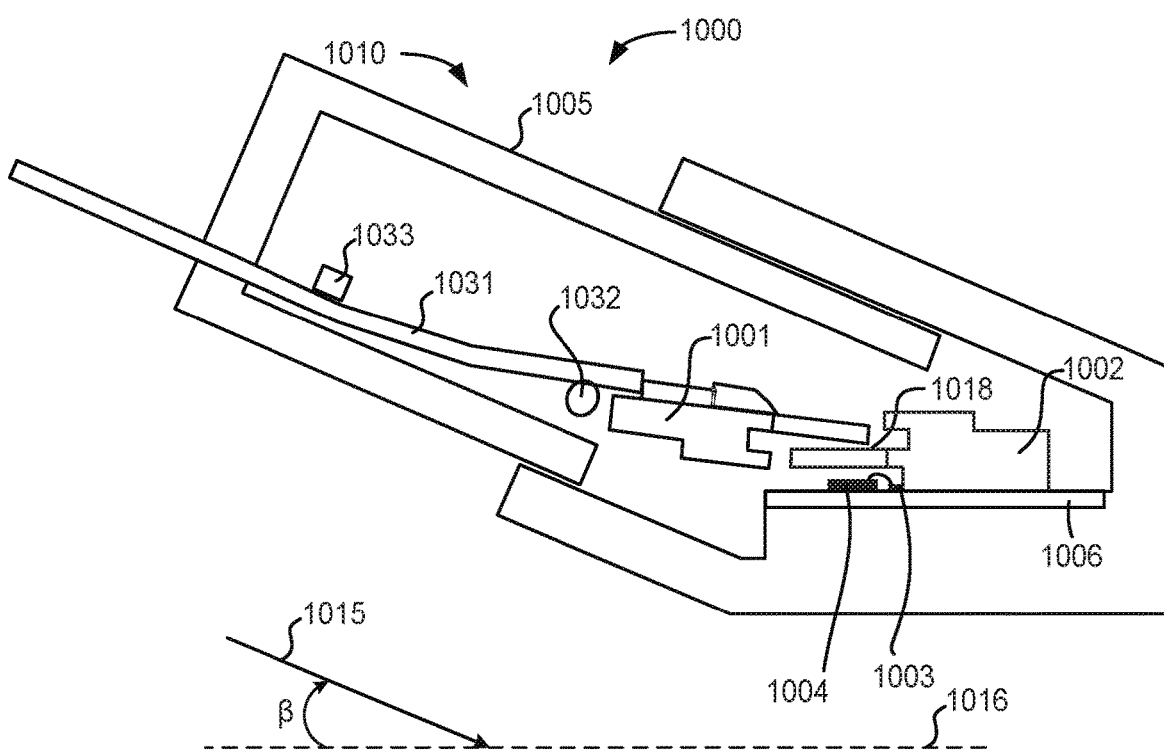

FIG. 10 illustrates another optical communication assembly 1000 that includes an optical connector 1010 comprising a body 1005 and a connector light coupling unit 1001, a transceiver light coupling unit 1002, and optoelectronic devices 1003. Also shown in FIG. 10 are integrated circuits 1004 wire bonded to the optoelectronic devices 1003. The transceiver light coupling unit 1002, optoelectronic devices 1003, and integrated circuits 1004 are disposed on PCB 1006. The mating direction 1015 of the optical connector 1010 is the direction that the connector body 1005 moves to mate the connector and transceiver light coupling units 1001, 1002. The transceiver light coupling unit 1002 has a mating surface 1018 that is at an angle with respect to the mating direction 1015 of the optical connector 1010. Line 1016 is parallel to mating surface 1018. The angle, β, between the mating direction 1015 of the optical connector 1010 and the mating surface 1018 of the transceiver light coupling unit 1002 may be from about 5 to about 25 degrees, or about 10 to about 20 degrees, or about 15 degrees, for example. When mating occurs between the connector light coupling unit 1001 and the transceiver light coupling unit 1002, the angle between the mating direction of the optical coupler 1015 and the mating surface 1018 of the transceiver light coupling unit causes the optical waveguide 1031 to bend, moving the optical waveguide 1031 away from one or both of the first and second waveguide supports 1032, 1033.

Figure 11:
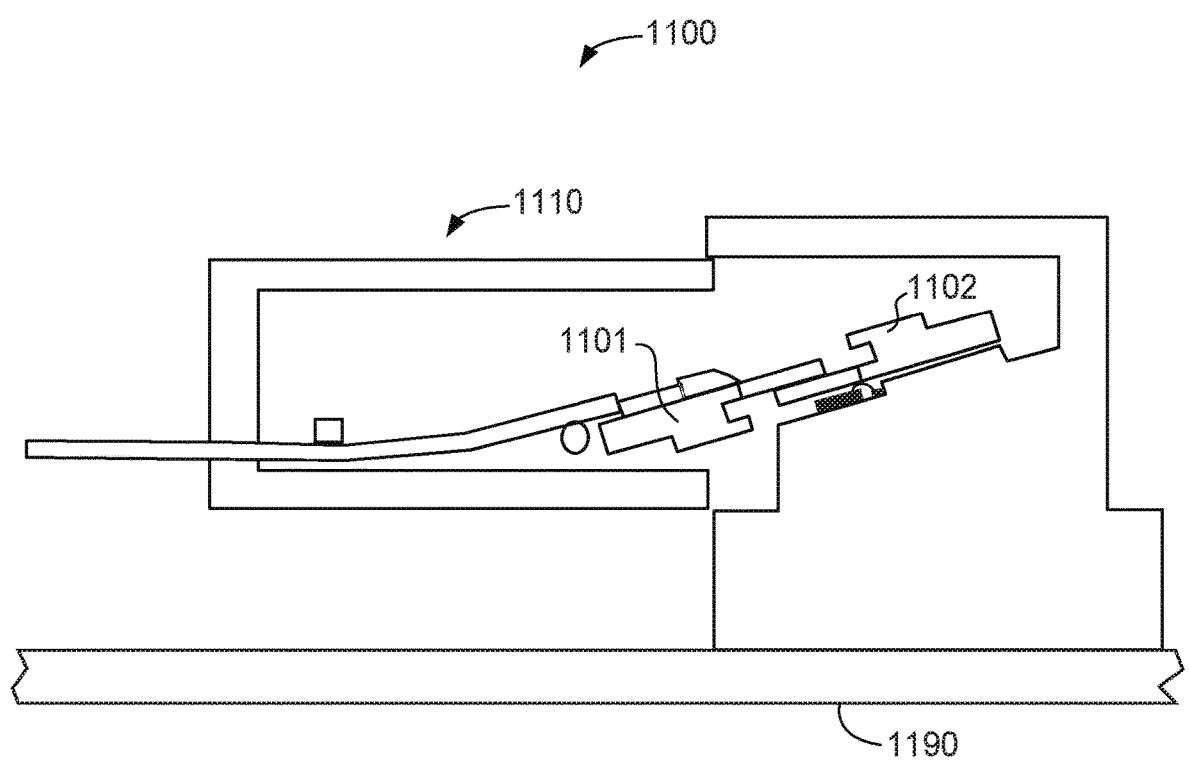
FIG. 11 shows an optical communication assembly including a transceiver light coupling unit disposed on a PCB and configured to mate with connector light coupling unit of an optical connector in a right angle connector configuration in accordance with some embodiments.
Figure 12:
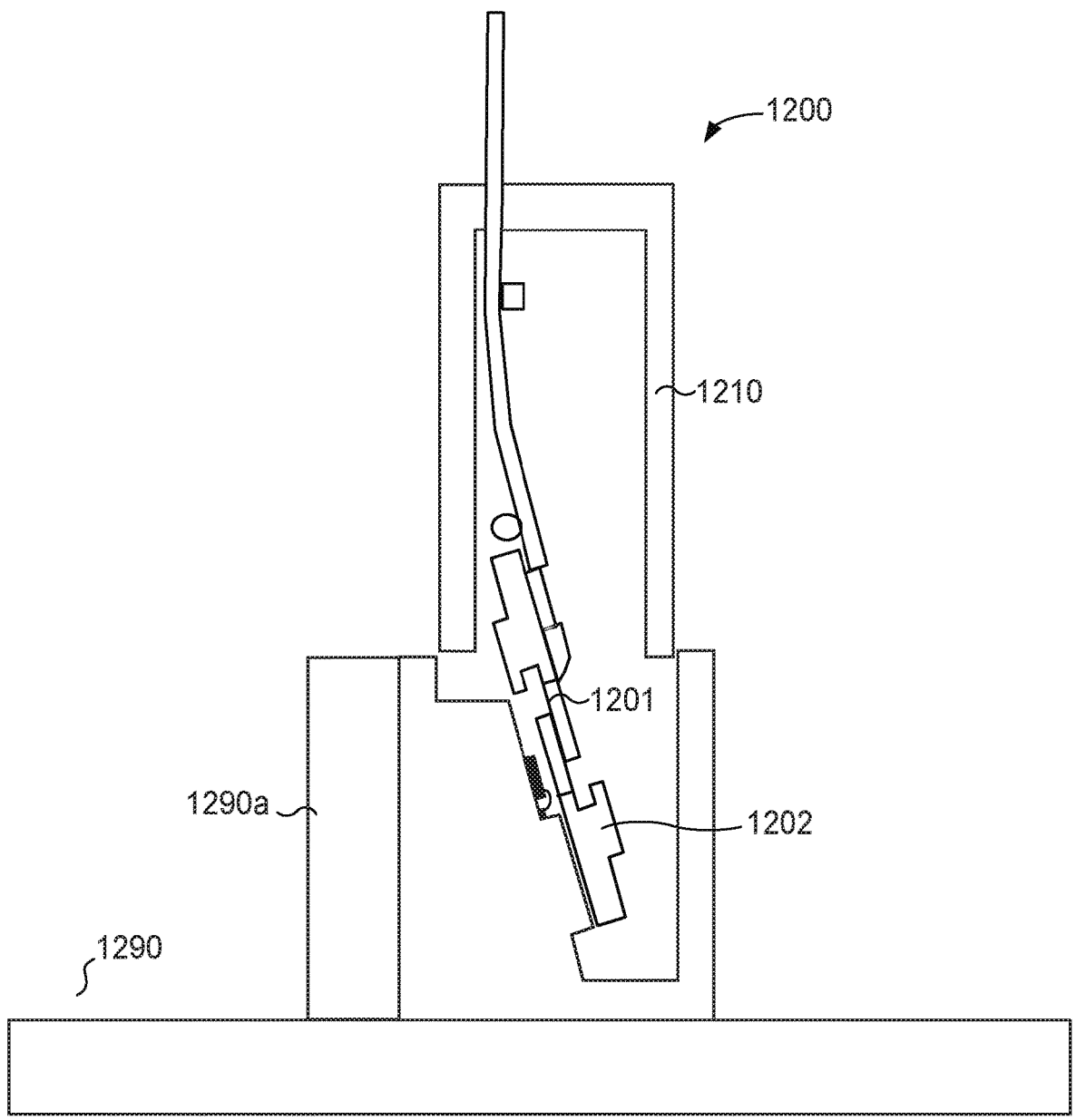
FIG. 12 shows an optical communication assembly including a transceiver light coupling unit configured to mate with a connector light coupling unit of an optical connector in a straight connector configuration, in accordance with some embodiments.
Figure 13:
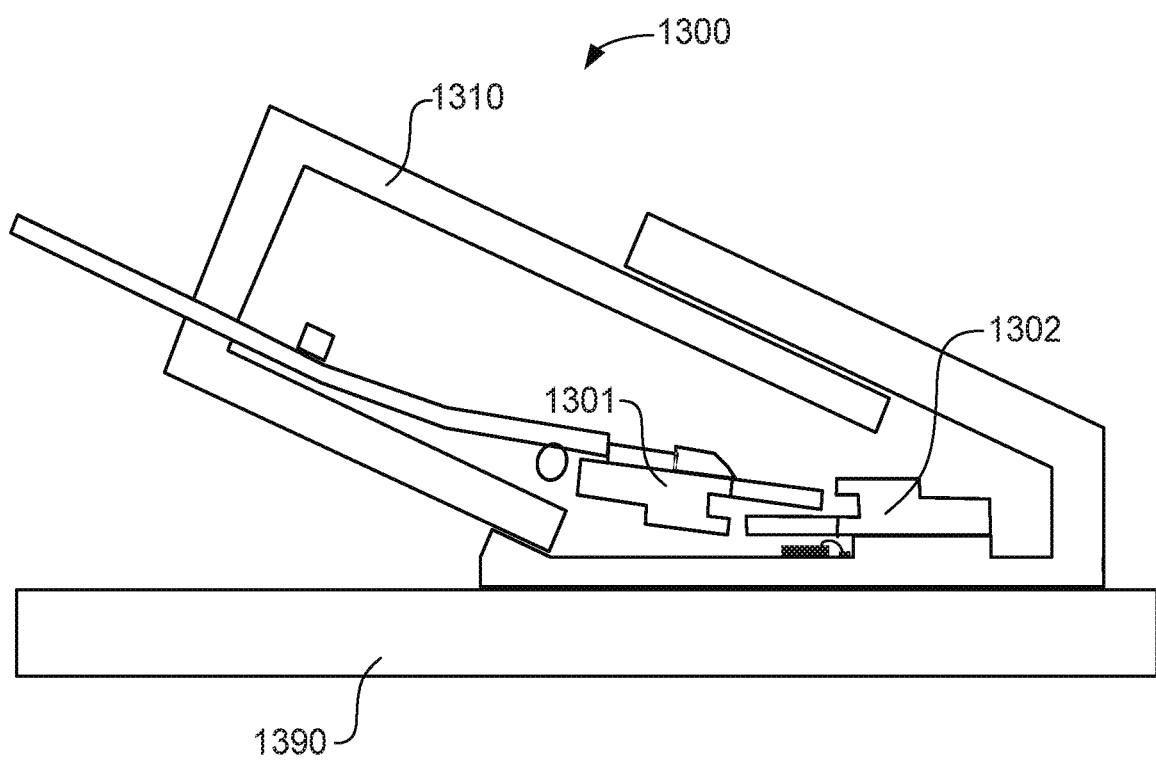
FIGS. 13-14 show an optical communication assemblies including a transceiver light coupling unit disposed on a PCB and configured to mate with a connector light coupling unit of an optical connector in an angled connector configuration in accordance with some embodiments.
Figure 14:
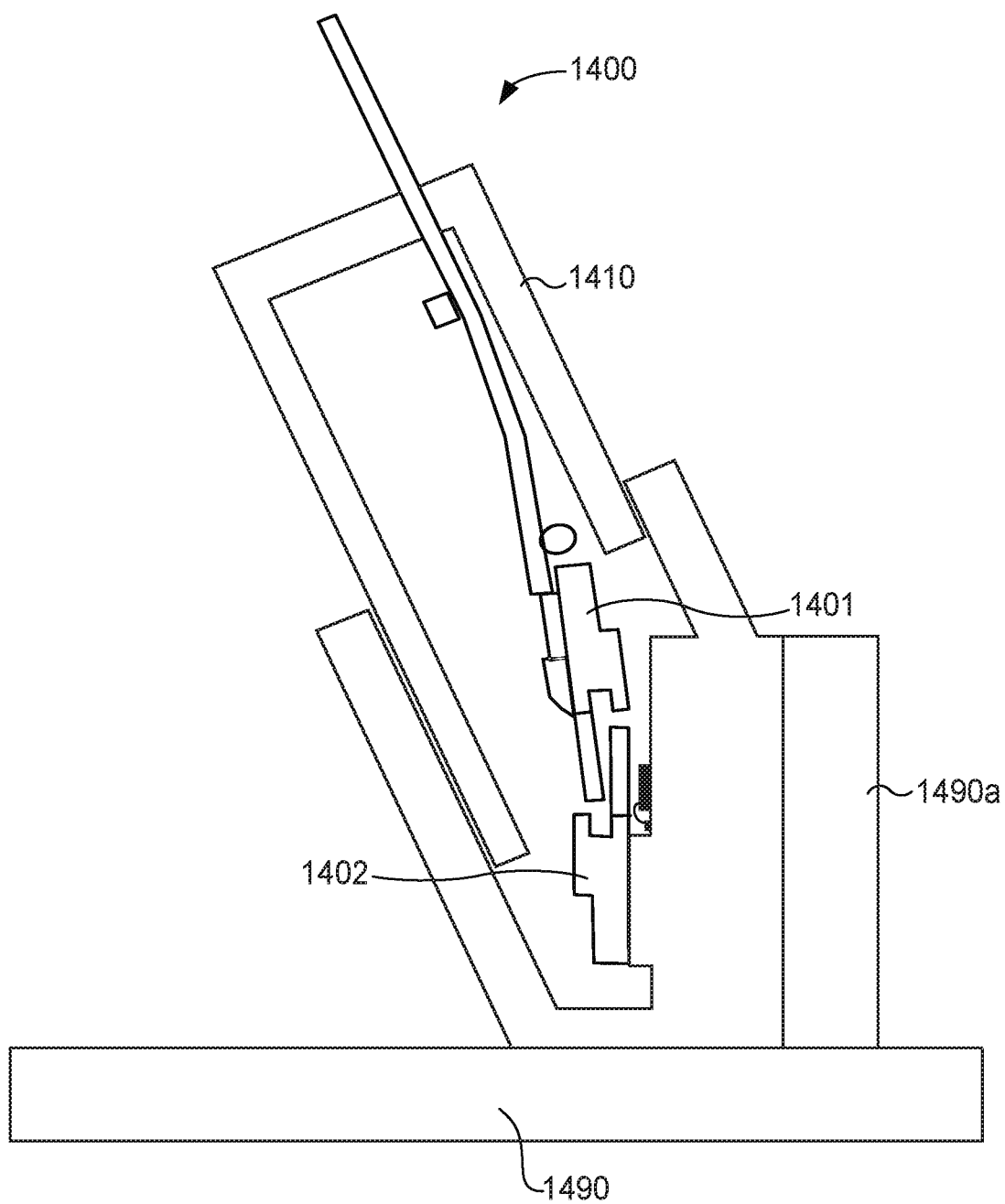

Some optical communication assemblies described herein may be mounted on a PCB to provide straight, angled, or right angle PCB connectors. FIG. 11 shows an optical communication assembly 1100 including a transceiver light coupling unit 1102 disposed on a PCB 1190 and configured to mate with connector light coupling unit 1101 of optical connector 1110 in a right angle connector configuration, that is, the mating direction is parallel to the surface of the PCB 1190. FIG. 12 shows an optical communication assembly 1200 including a transceiver light coupling unit 1202 disposed on a daughter PCB 1290a and electrically connected to PCB 1290. The transceiver light coupling unit 1202 is configured to mate with connector light coupling unit 1201 of optical connector 1210 in a straight connector configuration, that is, the mating direction is perpendicular to the surface of the PCB 1290. FIG. 13 shows an optical communication assembly 1300 including a transceiver light coupling unit 1302 disposed on a PCB 1390 and configured to mate with connector light coupling unit 1301 of optical connector 1310 in an angled connector configuration. FIG. 14 shows an optical communication assembly 1400 including a transceiver light coupling unit 1402 disposed on a daughter PCB 1490a and electrically connected to PCB 1490. The transceiver light coupling unit 1402 is configured to mate with connector light coupling unit 1401 of optical connector 1410 in an angled connector configuration.

Figure 15:
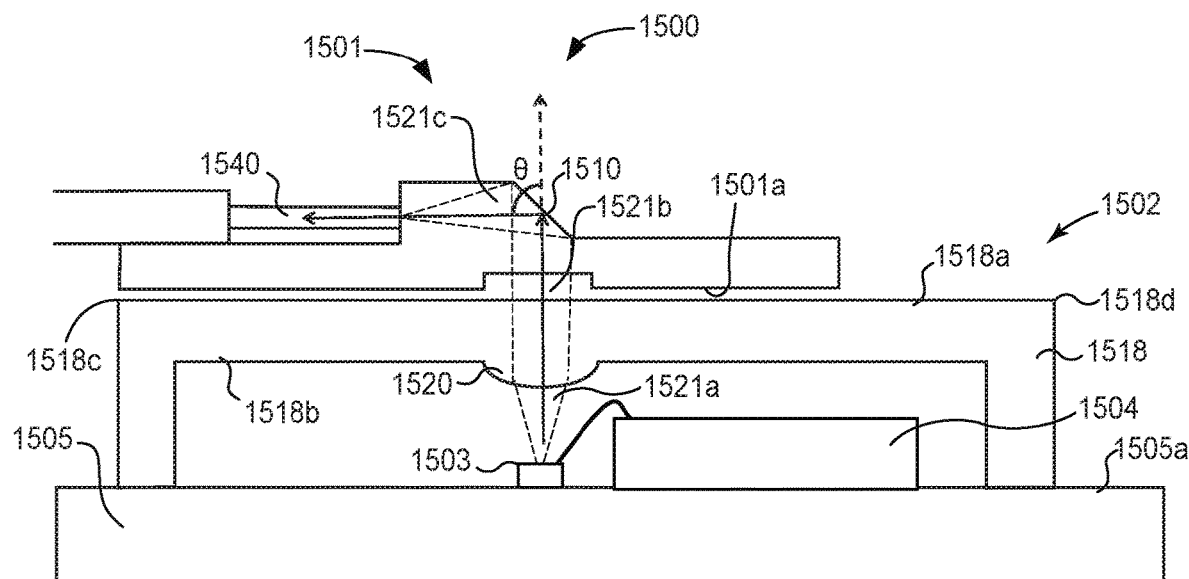
FIGS. 15, 16, 17A and 17B depict simplified side cross-sectional views of example optical communication assemblies that include a connector light coupling unit and a transceiver light coupling unit without housings and shown in a mated orientation in accordance with various embodiments.

FIG. 15 depicts a simplified side cross sectional view of an example optical communication assembly 1500 comprising an connector light coupling unit 1501 and a transceiver light coupling unit 1502 without housings and shown in a mated orientation. An optoelectronic device 1503 (a light emitter in this example) and integrated circuit 1504 are disposed on a PCB 1505. The transceiver light coupling unit 1502 includes a mechanical support member 1518 having a mating surface 1518a and opposing surface 1518b. An optical element 1520 is disposed on the opposing surface 1518b of the mechanical support member 1518 and is optically aligned with the optoelectronic device 1503. The mechanical support member 1518 supports the optical element 1520, such that there is an appropriate separation between the optoelectronic device 1503 and the optical element 1520, resulting in optical alignment between the connector light coupling unit 1501 and the optoelectronic device 1503 through the optical element 1520. In the configuration illustrated in FIG. 15, the mating surfaces 1501a and 1518a are substantially parallel to the surface 1505a of the PCB 1505.

In the mated configuration, the mating surface 1501a of the connector light coupling unit 1501 is adjacent to the mating surface 1518a of the transceiver light coupling unit 1502. When in operation in the mated configuration, the connector light coupling unit 1501 and the transceiver light coupling unit 1502 transfer light between the optoelectronic element 1503 and the optical waveguide 1540.

In the example illustrated in FIG. 15, the optoelectronic device 1503 comprises a light emitting device that emits a divergent light beam 1521a toward the optical element 1520. The optical element 1520 changes the divergence of the light beam and/or collimates the diverging light beam. The light beam 1521b that emerges from optical element 1520 is redirected by the light redirecting element 1510 of the connector light coupling unit 1501. In the embodiment shown in FIG. 15, the redirecting element 1510 changes the divergence and direction of the light beam 1521b such that the central ray of light beam 1521b is deflected by an angle, θ, of about 90 degrees. The light beam 1521c that emerges from the light redirecting element 1510 converges toward the optical waveguide 1540 of the connector light coupling unit 1501.

Figure 16:
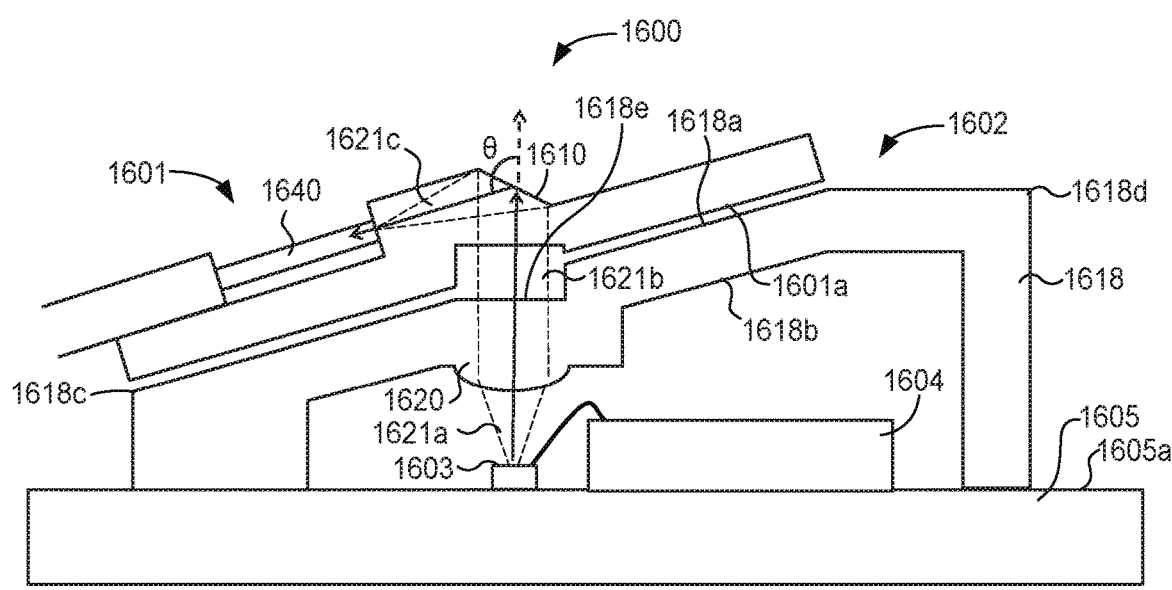

FIG. 16 depicts a simplified side cross sectional view of another example optical communication assembly 1600 comprising an connector light coupling unit 1601 and a transceiver light coupling unit 1602 without housings and shown in a mated orientation. An optoelectronic device 1603 (a light emitter in this example) and integrated circuit 1604 are disposed on a PCB 1605. The transceiver light coupling unit 1602 includes a mechanical support member 1618 having a mating surface 1618a and opposing surface 1618b, a mating edge 1618c and a base edge 1618d. The mating edge 1618c is the edge of the mating surface 1618a that first encounters the connector light coupling unit 1601 when mating occurs. In the configuration illustrated in FIG. 16, the mating surface 1618a is at an angle with respect to the surface 1605a of the PCB 1605 such that the mating surface 1618a is inclined toward the surface 1605a of the PCB 1605 from the base edge 1618d to the mating edge 1618c. In this configuration, the optical waveguide 1640 extends away from the connector light coupling unit 1601 at angle toward the PCB surface 1605a.

An optical element 1620 is disposed on the opposing surface 1618b of the mechanical support member 1618 and is optically aligned with the optoelectronic device 1603. The mechanical support member 1618 supports the optical element 1620, such that there is an appropriate separation between optoelectronic device 1603 and optical element 1620, resulting in optical alignment between the redirecting element 1610 of the connector light coupling unit 1601 and the optoelectronic device 1603 through the optical element 1620. In the mated configuration, the mating surface 1601a of the connector light coupling unit 1601 is adjacent to the mating surface 1618a of the transceiver light coupling unit 1602. When in operation in the mated configuration, the optical communications assembly 1600, including the connector light coupling unit 1601 and the transceiver light coupling unit 1602, transfers light between the optoelectronic element 1603 and the optical waveguide 1640.

In the example illustrated in FIG. 16, the optoelectronic device 1603 comprises a light emitting device that emits a divergent light beam 1621a substantially perpendicularly with respect to the emitting face of the optoelectronic device 1603 toward the optical element 1620. The optical element 1620 changes the divergence of the light beam 1621a and/or collimates the diverging light beam 1621a. The light beam 1621b that emerges from optical element 1620 is redirected by the light redirecting element 1610 of the connector light coupling unit 1601. In the embodiment shown in FIG. 16, the redirecting element 1610 changes the divergence and direction of the light beam 1621b such that the central ray of light beam 1621b is deflected by an angle, θ, of greater than 90 degrees. The light beam 1621c that emerges from the light redirecting element 1610 converges toward the input face of the optical waveguide 1640 of the connector light coupling unit 1601. As shown in FIG. 16, the optical element 1620 may be disposed in a recess or trench 1618e in the mechanical support structure 1618. The optical element 1620 may comprise a surface normal to the light beam 1621b from the optoelectronic device 1603 but not the mating surface (as shown in FIG. 16). Alternatively, as shown below in FIG. 17, the optical element 1720 disposed in the recess or trench 1718e may include a surface that is angled relative to the light beam 1721b to cause deflection of the light beam.

Figure 17A:
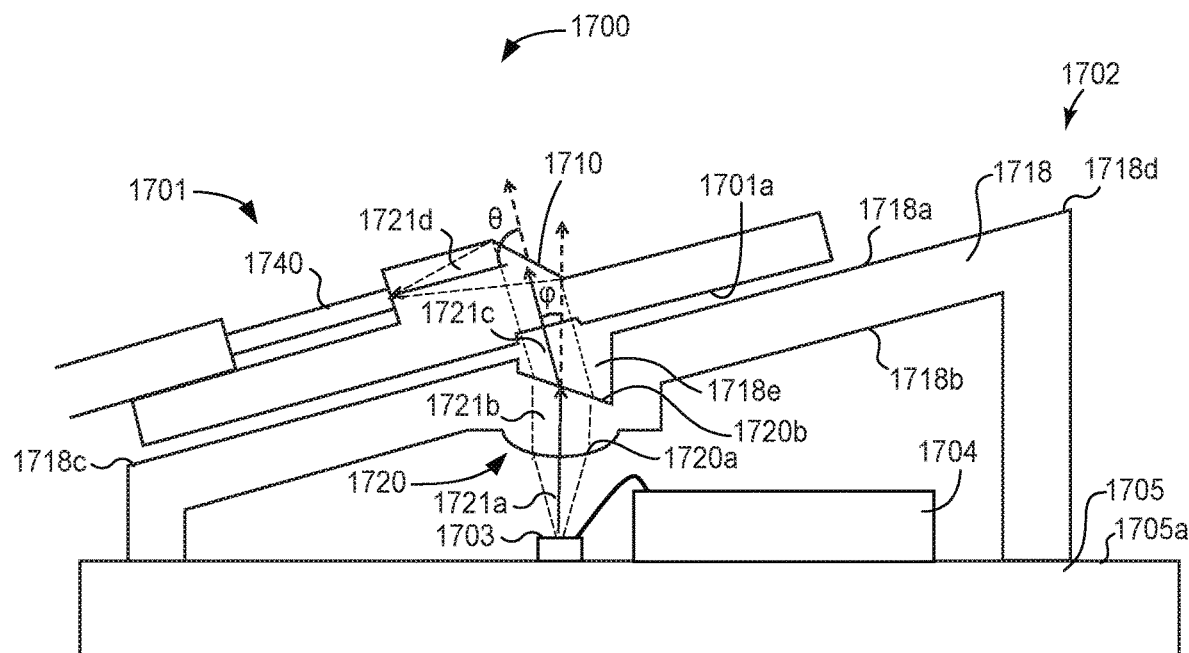

FIG. 17A depicts a simplified side cross sectional view of yet another example optical communication assembly 1700 comprising a connector light coupling unit 1701 and a transceiver light coupling unit 1702 without housings and shown in a mated orientation. An optoelectronic device 1703 (a light emitter in this example) and integrated circuit 1704 are disposed on a PCB 1705. The transceiver light coupling unit 1702 includes a mechanical support member 1718 having a mating surface 1718a and opposing surface 1718b, a mating edge 1718c and a base edge 1718d. The mating edge 1718c is the edge of the mating surface 1718a that first encounters the connector light coupling unit 1701 when mating occurs. In the configuration illustrated in FIG. 17, the mating surface 1718a is at an angle with respect to the surface 1705a of the PCB 1705 such that the mating surface 1718a is inclined toward the surface 1705a of the PCB 1705 from the base edge 1718d to the mating edge 1718c. In this configuration, the optical waveguide 1740 extends away from the connector light coupling unit 1701 at angle toward the PCB surface 1705a.

An optical element 1720 is disposed on the opposing surface 1718b of the mechanical support member 1718 and is optically aligned with the optoelectronic device 1703. The mechanical support member 1718 supports the optical element 1720, such that there is an appropriate separation and alignment between the optoelectronic device 1703 and the optical element 1720, resulting in optical alignment between the redirecting element 1710 of the connector light coupling unit 1701 and the optoelectronic device 1703 through the optical element 1720. In the mated configuration, the mating surface 1701a of the connector light coupling unit 1701 is adjacent to the mating surface 1718a of the transceiver light coupling unit 1702. When in operation in the mated configuration, the optical communications assembly 1700, including the connector light coupling unit 1701 and the transceiver light coupling unit 1702, transfers light between the optoelectronic element 1703 and the optical waveguide 1740.

In the example illustrated in FIG. 17A, the optoelectronic device 1703 comprises a light emitting device that emits a divergent light beam 1721a substantially perpendicularly with respect to the emitting face of the optoelectronic device 1703 toward the optical element 1720. The optical element 1720 is disposed below a recess or trench 1718e in the mechanical support structure 1718. The optical element 1720 includes first and second features 1720a, 1720b. The first feature 1720a, e.g., a lens, is configured to change the divergence of the light beam 1721a and/or to collimate the diverging light beam 1721a. The light beam 1721b that emerges from the first feature 1720a of the optical element 1720 is redirected by the second feature 1720b, e.g., a refractive feature such as a prism, of the optical element 1720 by an angle φ. Light beam 1721c that emerges from the second feature 1720b of the optical element 1720 is directed to the light redirecting element 1710, e.g., a light redirecting element, of the connector light coupling unit 1701. In the embodiment shown in FIG. 17, the redirecting element 1710 changes the divergence and direction of the light beam 1721c such that the central ray of light beam 1721c is deflected by an angle, θ, which can be about 90 degrees. The light beam 1721d that emerges from the light redirecting element 1710 converges toward the input face of the optical waveguide 1740 of the connector light coupling unit 1701. In this example, the central ray of light beam 1721a is redirected by an angle θ+φ which can be more than 90 degrees.

Figure 17B:
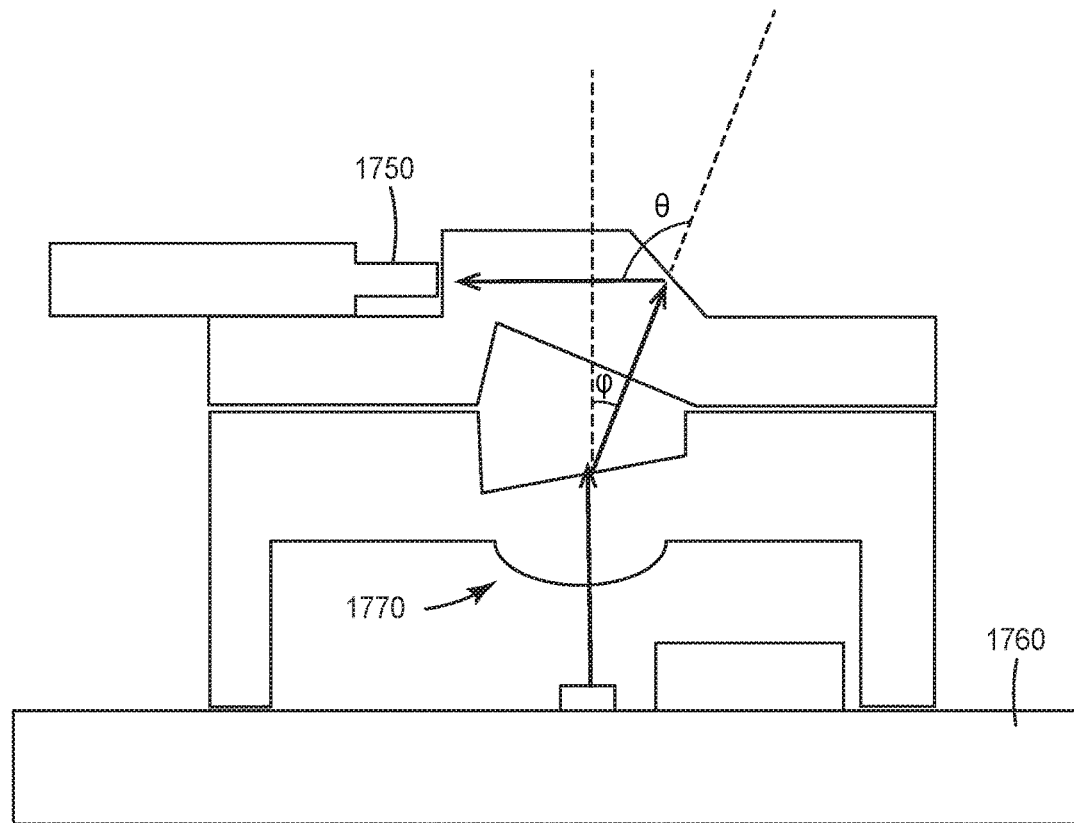

As depicted in FIG. 17B, in some embodiments, the optical fiber 1750 may exit substantially parallel to the PCB 1760, with a greater than 90 degree deflection in the connector (θ>90 degrees), providing the benefit of reduced loss. This embodiment includes an appropriate deviation, φ, of the expanded beam provided by the optical element 1770.

For the embodiments shown in FIGS. 15, 16, 17A, and 17B, and other embodiments described herein the mechanical support of the transceiver light coupling unit may provide protection or even a hermetic seal for the optoelectronic devices and/or the integrated circuits.

Figure 18A:
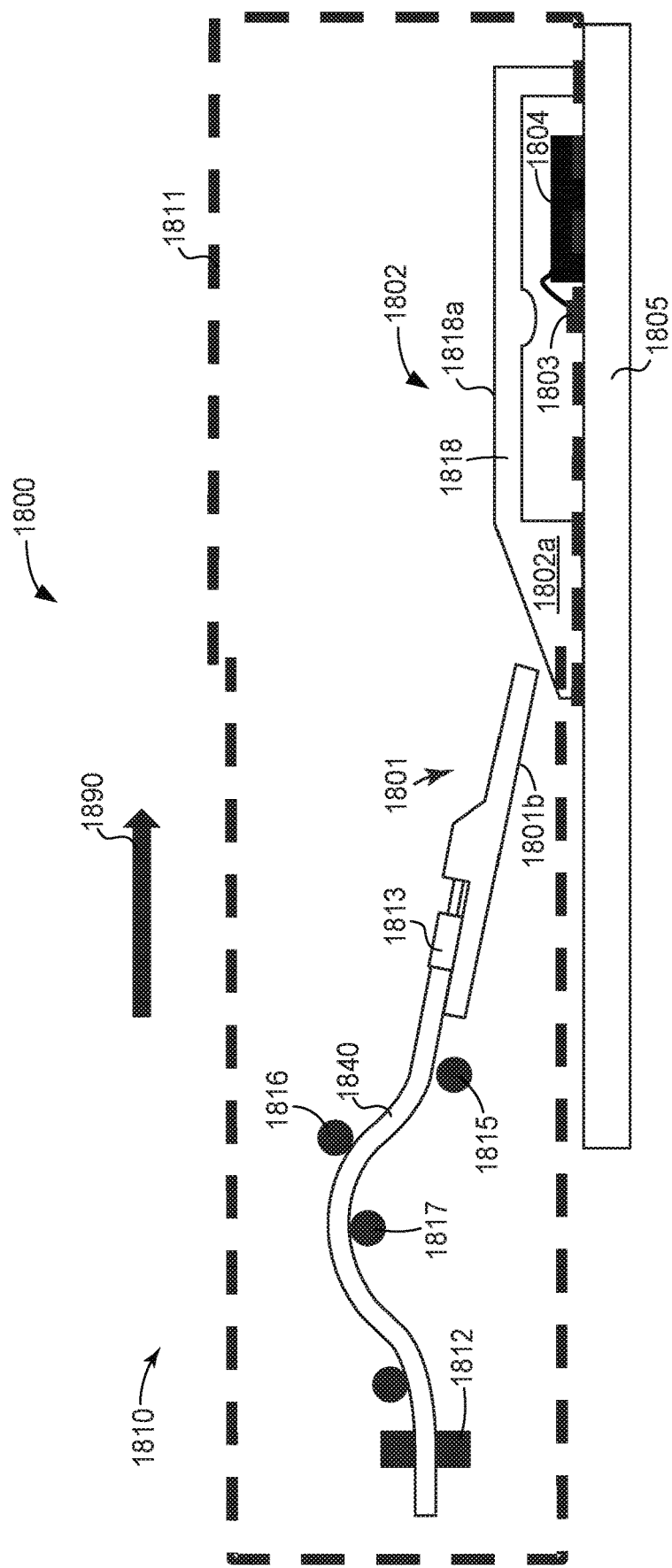

FIGS. 18A and 18B illustrate another embodiment involving expanded beam optical coupling wherein the connector light coupling unit is supported on an optical waveguide that acts as a spring to provide mating force between the connector light coupling unit and a mating light coupling unit. FIG. 18A shows an optical communications assembly 1800 that includes a transceiver light coupling unit 1802 and an connector light coupling unit 1801 attached to optical waveguide 1840. In FIG. 18A, optical communications assembly 1801 is shown in an unmated and approaching mating configuration. The connector light coupling assembly 1801 is disposed in a housing 1810, e.g., connector housing, having first 1815, second 1816, and third 1817 waveguide supports providing a double bend in the optical waveguide 1840. As previously discussed, the optical waveguide is attached at a first fiber attachment feature 1812 of connector body and is attached to the connector light coupling unit at a second fiber attachment feature 1813.

The transceiver light coupling unit 1802 includes a support structure 1818 disposed on PCB 1805 and having mating surface 1818a. Also arranged on the PCB 1805 are an optoelectronic device 1803 and integrated circuit 1804. The transceiver light coupling unit 1802, optoelectronic device 1803, and integrated circuit 1804 are disposed in a housing 1811, e.g., a receptacle housing.

The mating surface 1818a of the transceiver light coupling unit support structure 1818 and the mating direction indicated by arrow 1890 of the connector housing 1810 are substantially parallel in this example. The connector light coupling unit mating edge 1802a of the transceiver light coupling unit 1802 is beveled so that when the connector light coupling unit 1801 mates with the transceiver light coupling unit 1802, the light coupling unit 1801 comes into contact with the beveled mating edge 1802a. As the light coupling unit 1801 slides along the beveled edge 1802a, the connector light coupling unit rotates. As the connector 1810 moves further along the mating direction, the mating surface 1801b of the connector light coupling unit 1801 slides into a mating position adjacent to the mating surface 1818a of the transceiver light coupling unit 1802.

FIG. 18B shows the optical communications assembly 1800 after the connector light coupling unit 1801 and the transceiver light coupling unit 1802 are mated. In the mated configuration, the optical waveguide 1840 bends further, lifting the optical waveguide 1840 off at least the first waveguide support 1815. The bending of the optical fiber 1840 provides force to maintain the mating surfaces 1801b, 1818a in mating contact.

As previously discussed, optical communications assemblies can involve the use of fiber bending to provide a spring force that holds expanded beam light coupling units into mating contact. Additional information about light coupling units and components thereof applicable to the embodiments discussed in this disclosure is described in commonly owned U.S. patent applications: Ser. No. 61/710,083 filed Oct. 5, 2012, Ser. No. 61/710,077 filed Oct. 5, 2012, Ser. No. 61/710,067 filed Oct. 5, 2012, and Ser. No. 61/736,703 filed Dec. 13, 2012. Each of these patent applications is incorporated by reference herein.

Some embodiments may not rely on fiber bending to provide mating force and/or may rely on other techniques as well as fiber bending to secure the connector light coupling unit in mating contact with the transceiver light coupling unit. These embodiments may use connector light coupling units as described above and as described in the incorporated by reference patent applications.

Figure 19A:
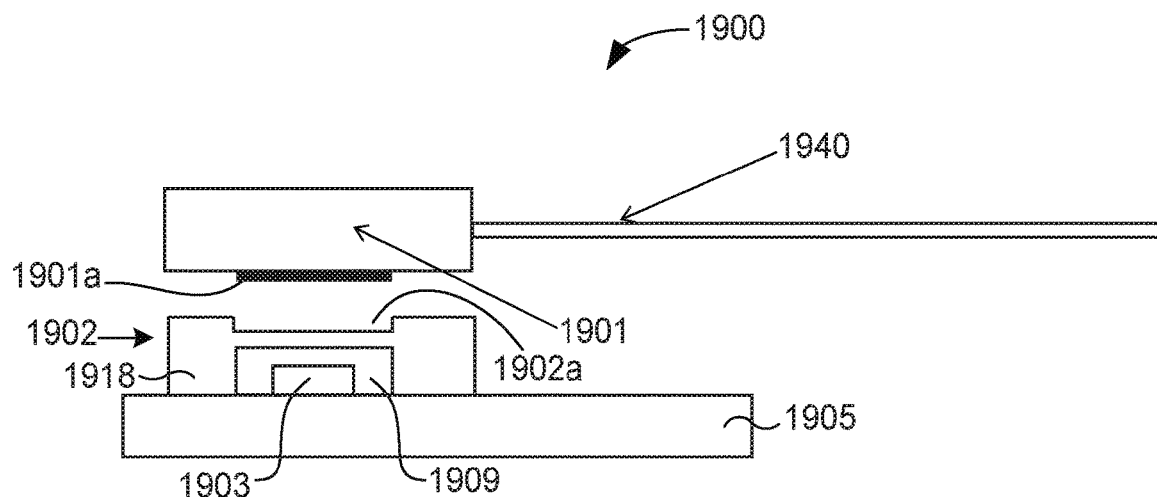
FIGS. 19A and 19B illustrate an optical communications assembly used in conjunction an electronic device, such as a cell phone, music storage device, tablet, or laptop computer in accordance with some embodiments.
Figure 19B:
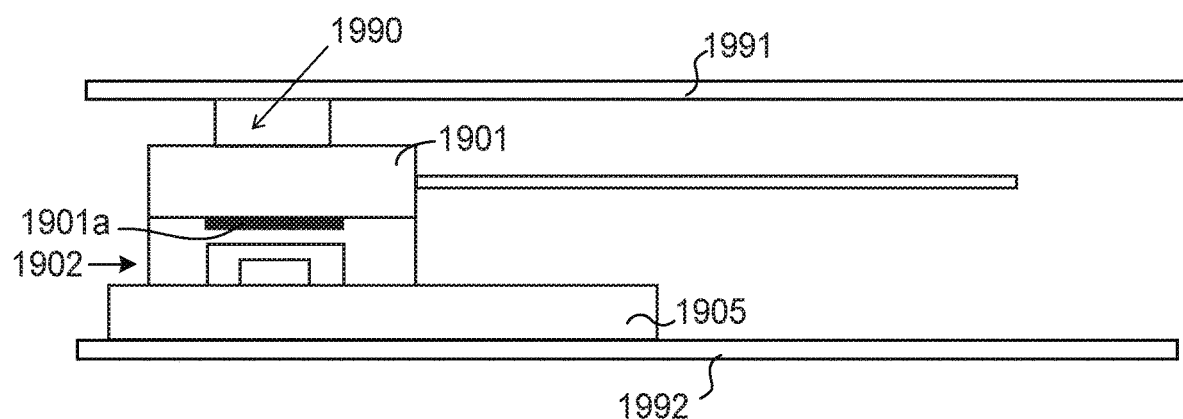

FIGS. 19A and 19B illustrate an optical communications assembly 1900 used with an electronic device, such as a cell phone, music storage device, tablet, or laptop computer. FIGS. 19A and 19B show the optical communications assembly 1900 in the unmated and mated conditions, respectively. In this example, the cover, housing, or lid 1991, 1992 of the electronic device, when installed, applies a force to the optical communications assembly 1900 to hold the subassemblies of the optical communications assembly 1900 in mating contact. FIG. 19A shows the unmated subassemblies of optical communications assembly 1900 including a connector light coupling unit 1901 having a light redirecting unit (not shown). The connector light coupling unit 1901 is attached to optical waveguide 1940. The optical communication assembly 1900 includes a transceiver light coupling unit 1902, and an optoelectronic device 1903 disposed within a cavity 1909 formed by the mechanical support structure 1918 and on PCB 1905. In some embodiments, the mechanical support structure 1918 of the transceiver light coupling unit 1902 has an optical element (not shown) disposed thereon. In some embodiments, the connector light coupling unit 1901 includes the optical element, and in still other embodiments, the optical element is disposed on the optoelectronic device 1903 itself. In all of these embodiments, when the connector light coupling unit 1901 is mated to the transceiver light coupling unit 1902, light can be transferred between the optical waveguide 1940 and the optoelectronic device 1903. As previously discussed, the light redirecting element of the connector light coupling unit 1900 is optically aligned with the optical waveguide 1940 and the optoelectronic device 1903 through the optical element.

The transceiver light coupling unit 1902 may include an alignment feature configured to mate with a compatible alignment feature of the connector light coupling unit 1901. As shown in FIGS. 19A and 19B, the connector light coupling unit 1901 may include a pin or protrusion 1901a that is configured to engage with a compatible hole or recess 1902a of the transceiver light coupling unit 1902. It will be appreciated that the connector light coupling unit may be formed to provide a recess or hole and the transceiver light coupling unit may provide a provide compatible a pin or protrusion. In some embodiments, the transceiver light coupling unit itself forms the pin and the connector light coupling unit includes protruding edges that fit over the transceiver light coupling unit.

FIG. 19B shows the optical communications assembly 1900 after mating. The protrusion fits into the groove to align the light coupling units 1901, 1902. The light coupling units 1901, 1902 are held in the mating position by a force exerted by the case 1991, 1992 of the device. The optical communications assembly is squeezed between the first and second portions 1991, 1992 of the case, and a force is applied substantially perpendicular to the mating surfaces of the connector light coupling unit 1901 and the transceiver light coupling unit 1902. In some configurations, a compliant layer or spring 1990 can be inserted between the case portion 1991 and the connector light coupling unit 1901 and/or between the case portion 1992 and the PCB 1905.

Figure 20:
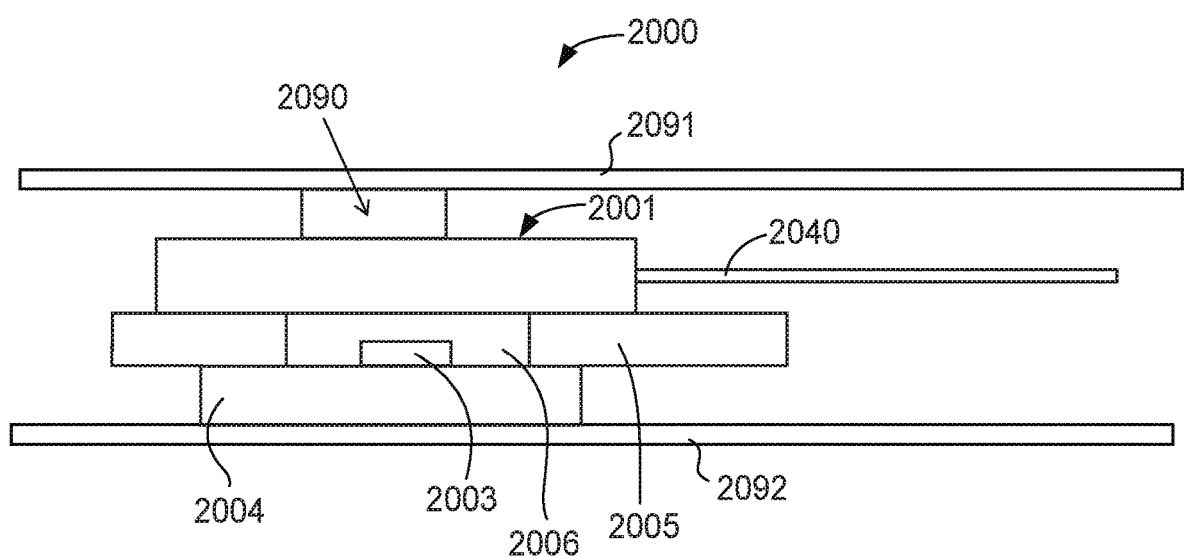
FIG. 20 illustrates another configuration of an optical communications assembly for an electronic device, wherein the case of the electronic device is used to hold the connector light coupling unit in mating alignment with the optoelectronic device in accordance with some embodiments.

FIG. 20 illustrates another configuration of an optical communications assembly for an electronic device, wherein the case 2091, 2092 of the electronic device is used to hold the connector light coupling unit 2001 in mating alignment with the optoelectronic device 2003. In the illustrated configuration, either the connector light coupling unit 2001 includes the optical element (not shown) or the optical element is disposed on the optoelectronic device 2003. After mating, the light redirecting element of the connector light coupling unit 2001 is held in optical alignment with the optical waveguide 2040 and the optoelectronic device 2003 through the optical element by force applied through the case 2091, 2092 of the electronic device. The optoelectronic device 2003 is mounted on a second PCB 2004 (i.e. daughter board) and within a hole 2006 in a first PCB 2005 (i.e. motherboard). The connector light coupling unit 2001 is squeezed between the first and second portions 2091, 2092 of the case. In some configurations, a compliant layer or spring 2090 can be inserted between the case portion 2091 and the connector light coupling unit 2001 and/or between the case portion 2092 and the second PCB 2004.

Figure 21A:
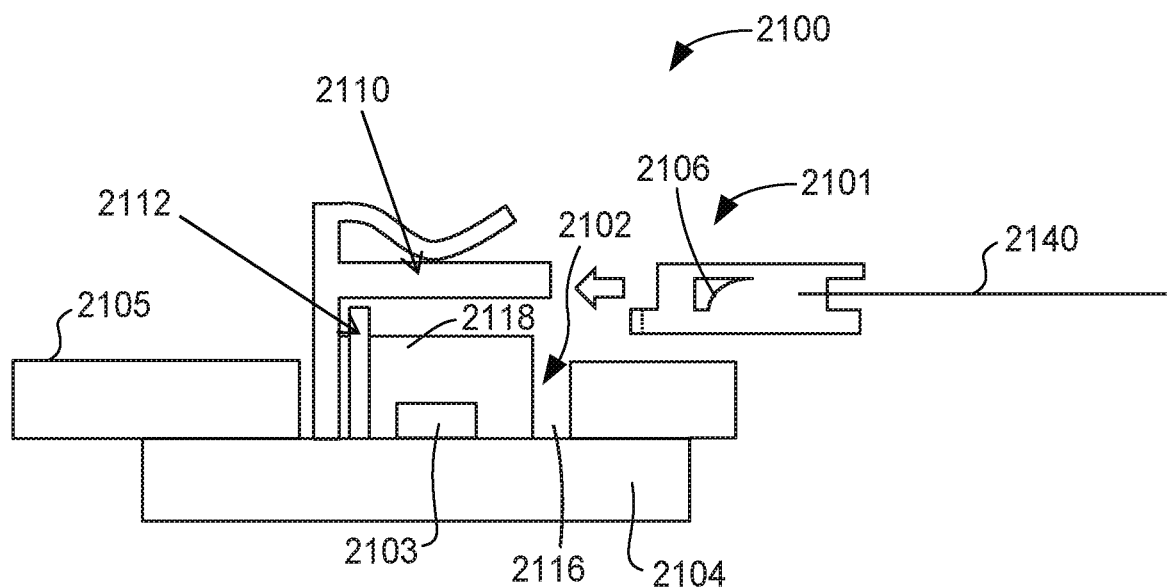
FIGS. 21A and 21B illustrate another configuration of an optical communications assembly arranged on first and second printed circuit boards in accordance with some embodiments.
Figure 21B:
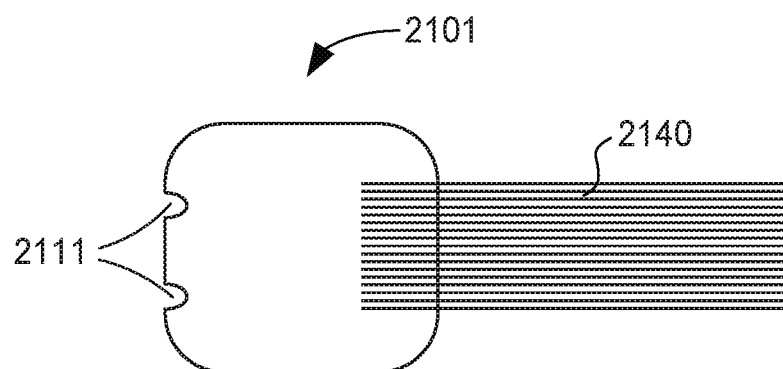

FIG. 21A illustrates another configuration of an optical communications assembly 2100 that is similar in some respects to the optical communications assembly 2000 of FIG. 20. Like optical communications assembly 2000, optical communications assembly 2100 includes an optoelectronic device 2103 mounted on second PCB 2104 and within a hole 2116 in a first PCB 2105. Optical communications assembly 2100 includes a connector light coupling unit 2101 (also shown in a top view in FIG. 21B) and a transceiver light coupling unit 2102. In this example, transceiver light coupling unit includes a mechanical support structure 2118 that can optionally support optical elements (not shown) disposed on the mechanical support structure 2118. When the connector light coupling unit 2101 and the transceiver light coupling unit 2102 are mated, the light redirecting element 2106 of the connector light coupling unit is in optical alignment with the optoelectronic device 2103 through the optical element. When the connector light coupling unit 2101 and the transceiver light coupling unit 2102 are mated, the light can be transferred between the optical fiber 2140 and the optoelectronic device 2103.

In the embodiment shown in FIG. 21A, the connector light coupling unit 2101 and the transceiver light coupling unit 2102 are aligned in the mating configuration by alignment features 2111 (e.g. alignment slots) on the connector light coupling unit 2101 and alignment pins 2112 disposed on the transceiver coupling unit 2102, which engage upon mating with connector light coupling unit. The connector light coupling unit 2101 and the transceiver light coupling unit 2102 are held in the mating configuration by a spring feature 2110 that applies force to the connector light coupling unit 2101.

FIGS. 22A-22D illustrate a mating arrangement for an optical communications assembly 2200 in accordance with some configurations. Optical communications assembly 2200 includes a connector light coupling unit 2201 attached to an optical waveguide 2240 and configured to mate with a transceiver light coupling unit 2202. The optoelectronic device and PCB are not shown in these diagrams, but in the mating configuration, the optoelectronic device would be arranged so that the optoelectronic device is in optical alignment with the light redirecting element (not shown) of the connector light coupling unit 2201 through an optical element (not shown) as previously discussed. The mating configuration allows for light to be transferred between the optical fiber 2240 and the optoelectronic device.

Figure 22A:
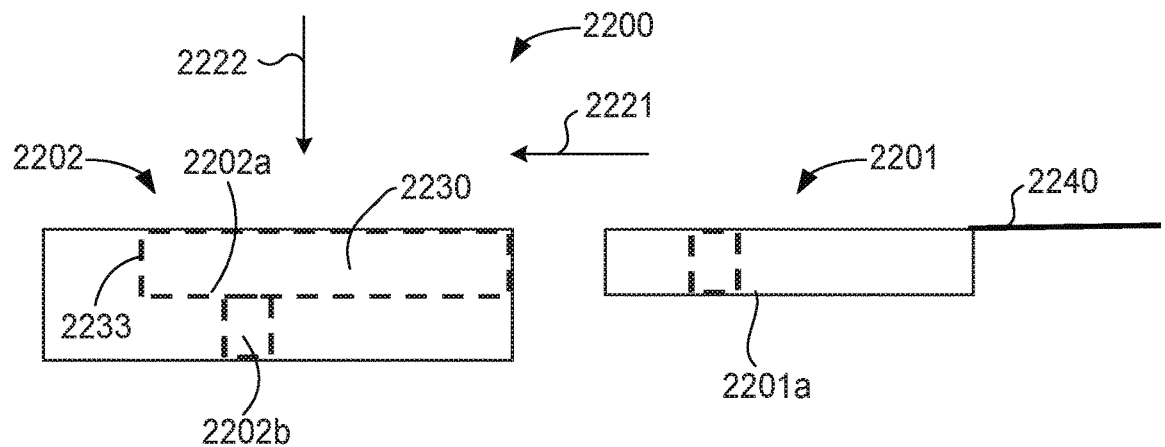
FIGS. 22A-22D illustrate a mating arrangement for an optical communications assembly 2200 in accordance with some configurations.
Figure 22B:
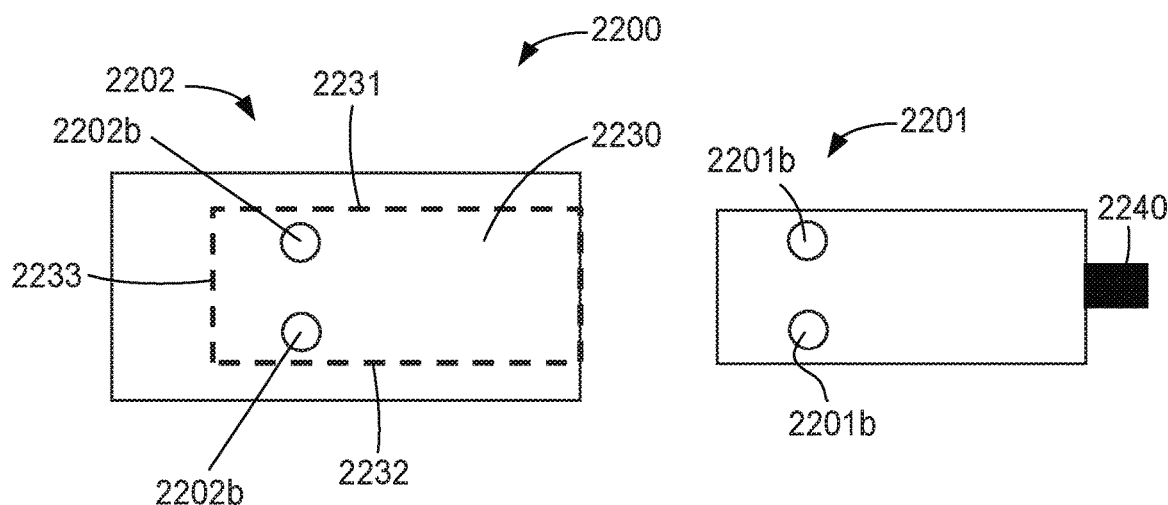
Figure 22C:
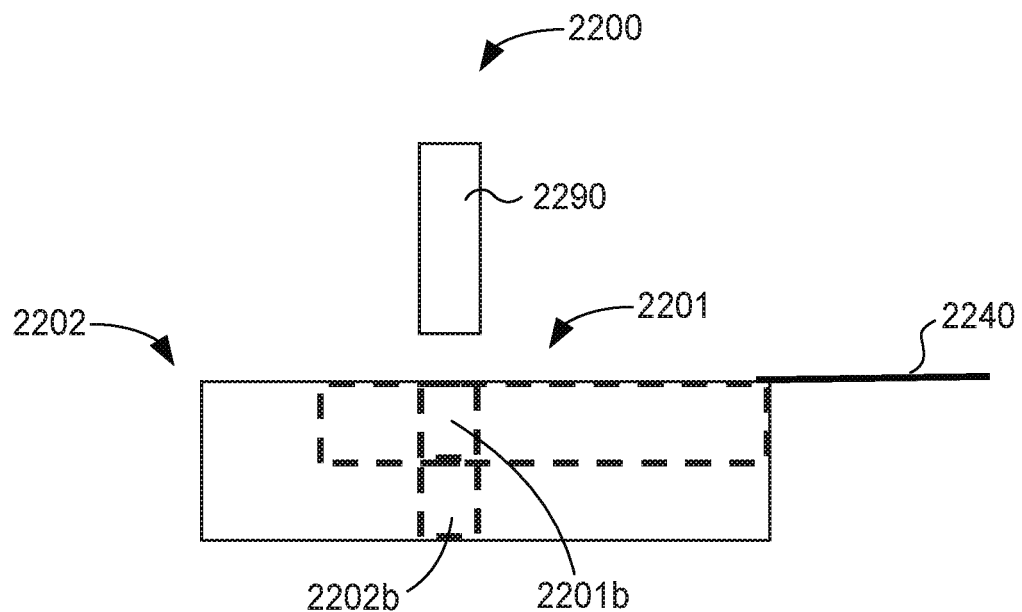
Figure 22D:
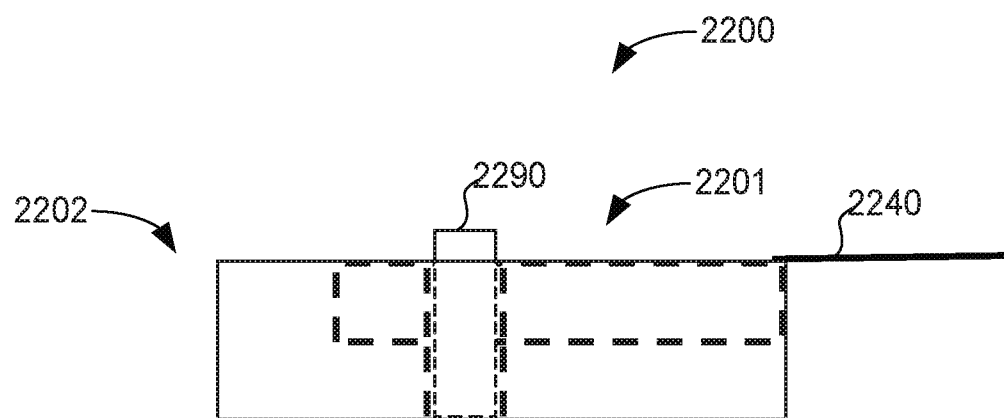

The transceiver light coupling unit 2202 comprises a slot 2230 wherein the connector light coupling unit 2201 can be inserted along a direction 2221 parallel to the mating surfaces 2201a, 2202a of the light coupling units 2201. The slot 2230 includes sides 2231, 2232 and an end 2233 that provide for a coarse optical alignment between the connector light coupling unit 2201 and the transceiver light coupling unit 2202 when the connector light coupling unit 2201 is inserted into the slot 2230. The light coupling units 2201, 2202 include holes 2201b, 2202b configured to accept compatible mating pins 2290 that provide fine optical alignment between the connector light coupling unit 2201 and the transceiver light coupling unit 2202. FIGS. 22A and 22B show side and top views, respectively, of the optical communications assembly 2200 prior to insertion of the connector light coupling unit 2201 into the slot 2230 of the transceiver light coupling unit 2202. FIG. 22C shows a side view of the optical communications assembly 2200 after insertion of the connector light coupling unit 2201 into the slot of the transceiver light coupling unit 2202. FIG. 22D shows a side view of the optical communications assembly 2200 after insertion of the connector light coupling unit 2201 into the slot 2230 of the transceiver light coupling unit 2202 and after insertion of the fine alignment pins 2290 into the alignment holes 2201b, 2202b. In some embodiments, the alignment holes may extend substantially perpendicularly to the alignment surfaces 2201a, 2202a. In some embodiments, the alignment holes may extend along an angle that is not perpendicular to the mating surfaces 2201a, 2201a.

It will be appreciated that additional embodiments include an optical communications assembly wherein the connector light coupling unit has a slot that is inserted over or onto the transceiver light coupling unit. Additionally or alternatively, the optical communications assembly could be a component of an electronic device, as previously discussed in connection with FIGS. 19A, 19B, and 20, and the fine alignment pins could be disposed on the cover or case of the electronic device. The force applied by installation of the electronic device case would apply a spring force to the optical communications assembly, while the fine alignment pins disposed on the case and inserted through the holes in the light coupling units align the optical components in the mating position. In some embodiments, the alignment holes and pins may be tapered. Some embodiments use one or more diamond shaped alignment holes and pins. For example, in some cases, a single diamond shaped alignment hole and compatible diamond shaped pin can be used.

Figure 23A:
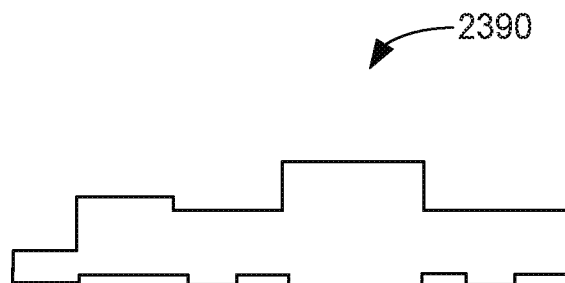
FIGS. 23A and 23B illustrate side and top views, respectively, of an alignment frame configured to mount on a printed circuit board that may be used to align a connector light coupling unit with an optoelectronic device mounted on the printed circuit board according to some embodiments.
Figure 23B:
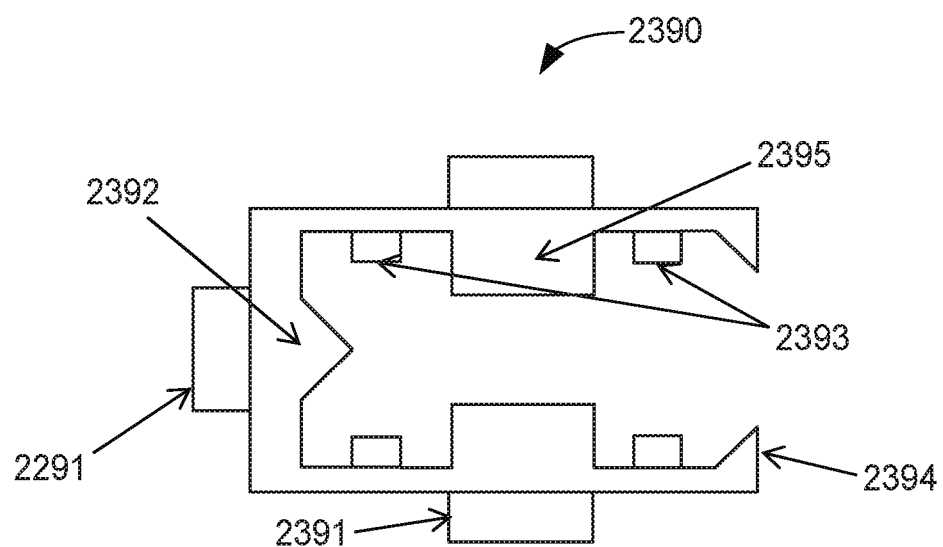

FIGS. 23A and 23B illustrate side and top views, respectively, of an alignment frame configured to mount on a PCB that may be used to align a connector light coupling unit with an optoelectronic device mounted on the PCB. The alignment frame 2390 can include one or more features including bond tabs 2391 for bonding the alignment frame 2390 to the PCB; a spring feature 2395 to hold down the connector light coupling unit within the frame 2390; one or more alignment features 2392, e.g., a wedge-shaped alignment feature, configured to provide lateral and/or longitudinal alignment of the connector light coupling unit within the frame 2390 in optical alignment with the optoelectronic device; support tabs 2393 that maintain the vertical alignment of the connector light coupling unit with respect to the optoelectronic device; and spring latches 2394 configured to hold the connector light coupling unit against the alignment feature 2392. The spring feature 2395 may be or comprise a gull wing structure.

Figure 23C:
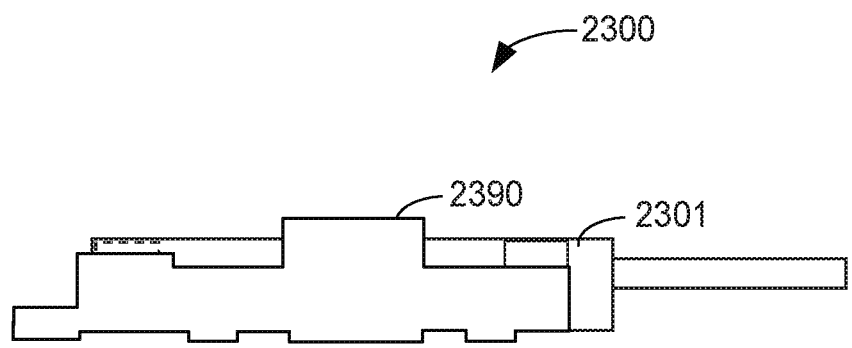
FIGS. 23C and 23D show side and top views, respectively of the alignment frame of FIGS. 23A and 23B with a connector light coupling unit inserted in the frame.
Figure 23D:
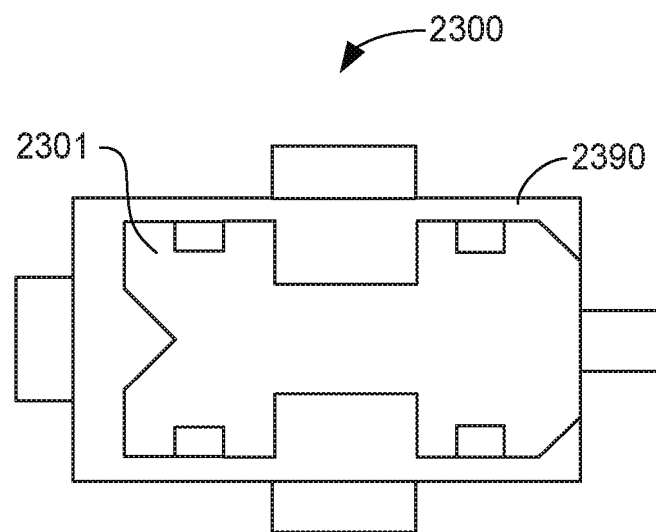

FIGS. 23C and 23D show side and top views, respectively of an optical communications assembly 2300 comprising an alignment frame 2390 with a connector light coupling unit 2301 in the frame 2390.

Embodiments disclosed herein include the following items:

Item 1. An optical communication subassembly, comprising:
 one or more optoelectronic devices;
 one or more optical elements, each optical element having an input side configured to receive incoming light and an output side configured to output outgoing light, each optical element configured to change a divergence of the outgoing light relative to a divergence of the incoming light, each optical element spaced apart from and optically aligned with a corresponding optoelectronic device; and
 a transceiver light coupling unit, the transceiver light coupling unit having a mating surface configured for mating with a connector light coupling unit attached to an optical waveguide, wherein a mating direction of the optical light coupling unit forms an angle with the mating surface of the transceiver light coupling unit such that when the connector light coupling unit mates with the transceiver light coupling unit, the angle between the mating direction of the connector light coupling unit and the mating surface of the transceiver light coupling unit causes the optical waveguide to bend.

Item 2. The subassembly of item 1, wherein the transceiver light coupling unit has a transceiver unit mating surface that extends along a direction that is different from the mating direction.

Item 3. The subassembly of any of items 1 through 2, wherein the connector light coupling unit is unitary.

Item 4. The subassembly of any of items 1 through 3, wherein the transceiver light coupling unit is unitary.

Item 5. The subassembly of any of items 1 through 4, wherein the transceiver light coupling unit is configured so that when a mating surface of the transceiver light coupling unit and a mating surface of the connector light coupling unit come into contact during mating, the transceiver light coupling unit exerts a force on the connector light coupling unit causing the optical waveguide to bend.

Item 6. The subassembly of any of items 1 through 5, wherein the angle between the mating direction of the optical coupling unit and the mating surface of the transceiver light coupling unit is between about 5 to about 60 degrees.

Item 7. The subassembly of any of items 1 through 5, wherein the angle between the mating direction of the optical coupling unit and the mating surface of the transceiver light coupling unit is between about 10 to about 30 degrees.

Item 8. The subassembly of any of items 1 through 7, wherein the difference between the mating angle of the optical coupling unit and the mating surface of the transceiver light coupling unit is about 15 degrees.

Item 9. The subassembly of any of items 1 through 8, wherein when the transceiver light coupling unit mates with the connector light coupling unit, the connector light coupling unit rotates at least 0.5 degrees.

Item 10. The subassembly of any of items 1 through 9, wherein when the transceiver light coupling unit mates with the connector light coupling unit, the connector light coupling unit rotates at least 2 degrees.

Item 11. The subassembly of any of items 1 through 10, wherein when the transceiver light coupling unit mates with the connector light coupling unit, the connector light coupling unit rotates more than 5 degrees.

Item 12. The subassembly of any of items 1 through 11, wherein, when in operation, as a result of the mating, there is a transfer of one or both of light and electricity between the transceiver light coupling unit and the connector light coupling unit.

Item 13. The subassembly of any of items 1 through 12, further comprising integrated circuits electrically coupled to the plurality of optoelectronic devices, wherein the transceiver light coupling unit forms a hermetic seal for the optoelectronic devices and the integrated circuits.

Item 14. The subassembly of an of items 1 through 13, wherein the one or more optical elements are disposed on a mechanical support of the transceiver light coupling unit.

Item 15. The subassembly of any of items 1 through 14, wherein the one or more optical elements are respectively disposed in one or more recesses in a mating surface of the transceiver light coupling unit.

Item 16. The subassembly of any of items 1 through 14, wherein the one or more optical elements are disposed in a trench in the mating surface of the transceiver light coupling unit.

Item 17. The subassembly of any of claims 1 through 16, wherein the transceiver light coupling unit includes a mating surface configured to mate with a mating surface of the connector light coupling unit, the mating surface of the transceiver light coupling unit comprising at least one lateral alignment feature configured to provide lateral alignment for the connector light coupling unit.

Item 18. The subassembly of item 17, wherein the at least one lateral alignment feature comprises opposing alignment features disposed on either side of the mating surface of the transceiver light coupling unit.

Item 19. The subassembly of item 18, wherein the opposing alignment features comprise first and second wedge-shaped protrusions arranged to receive the light coupling unit between the first and second alignment protrusions.

Item 20. The subassembly of item 17, wherein the at least one alignment feature comprises an alignment protrusion or alignment trench configured to engage with a corresponding alignment feature of the connector light coupling unit.

Item 21. The subassembly of any of items 1 through 20, wherein:
the optoelectronic devices are disposed on a printed circuit board (PCB); and
further comprising integrated circuits electrically coupled to the optoelectronic devices, the integrated circuits disposed on the PCB.

Item 22. The subassembly of item 21, wherein at least some of the optoelectronic devices are surface emitting semiconductor lasers and the integrated circuits comprise driver circuitry for the surface emitting semiconductor lasers.

Item 23. The subassembly of item 22, wherein the corresponding optical elements are configured to collimate the light received from the surface emitting semiconductor lasers.

Item 24. The subassembly of item 21, wherein at least some of the optoelectronic devices are photodetectors and the integrated circuits comprise receiver circuitry for the photodetectors.

Item 25. The subassembly of item 24, wherein the corresponding optical elements are configured to focus light received from the connector light coupling unit onto the photodetectors.

Item 26. The subassembly of any of items 1 through 25, wherein the optoelectronic devices are disposed on a printed circuit board (PCB) having a mounting surface that is not parallel to a mating surface of the transceiver light coupling unit.

Item 27. The subassembly of any of items 1 through 25, wherein the optoelectronic devices are disposed on a printed circuit board (PCB) having a mounting surface that is about parallel to a mating surface of the transceiver light coupling unit.

Item 28. The subassembly of any of claims 1 through 27, wherein the optical elements comprise a first feature configured to change the divergence of the input light.

Item 29. The subassembly of item 28, wherein the optical elements comprise a second feature configured to change a direction of the input light.

Item 30. The subassembly of item 29, wherein the first feature is a lens and the second feature is a prism.

Item 31. The subassembly of any of items 1 through 30, wherein the optical elements are configured to change the divergence and direction of the input light.

Item 32. The subassembly of any of claims 1 through 31, wherein:
the connector light coupling unit is disposed in a connector housing having a mating direction;
the transceiver light coupling unit has a mechanical support structure, wherein a mating surface of the transceiver light coupling unit extends from a rear edge of the mechanical support structure to a mating edge of the mechanical support structure along a direction that is not perpendicular or parallel to the mating direction.

Item 33. The subassembly of item 32, wherein:
the optoelectronic devices are mounted on a printed circuit board; and
the mating surface of the transceiver support unit extends from the rear edge to the mating edge toward the surface of the PCB.

Item 34. The subassembly of item 32, wherein:
the optoelectronic devices are mounted on a printed circuit board; and
the mating surface of the transceiver support unit extends from the rear edge to the mating edge away from the surface of the PCB.

Item 35. An optical communication assembly, comprising:
an optical connector comprising an connector light coupling unit, the connector light coupling unit configured to couple light between a plurality of waveguides and a plurality of light redirecting elements, each light redirecting element optically coupled to a corresponding optical waveguide having a core diameter, the light redirecting element being configured to direct light emerging from the optical waveguide such that the directed light has a diameter greater than the core diameter of the optical waveguide;
a plurality of optoelectronic devices;
a plurality of optical elements, each optical element configured to change a divergence of light passing through the optical element, each light redirecting element optically coupled to a corresponding optoelectronic device through a corresponding optical element; and
a transceiver light coupling unit configured for mating with the connector light coupling unit and to couple light between the connector light coupling unit and the plurality of optoelectronic devices, a mating direction of the optical connector forming an angle with the mating surface of the transceiver light coupling unit such that when the connector light coupling unit mates with the transceiver light coupling unit, the angle between the mating direction of the optical connector and the mating surface of the transceiver light coupling unit causes the plurality of optical waveguides to bend.

Item 36. The assembly of item 35, wherein:
the optoelectronic devices and transceiver light coupling unit are mounted on a surface of a printed circuit board (PCB) and disposed within a housing of a receptacle connector;
the optical connector comprises a plug connector configured to mate with the receptacle connector, wherein the mating direction of the optical connector is substantially perpendicular to the surface of the PCB.

Item 37. The assembly of any of items 35 through 36, wherein:
the optoelectronic devices and transceiver light coupling unit are mounted on a surface of a printed circuit board (PCB) and are disposed within a housing of a receptacle connector;
the optical connector comprises a plug connector configured to mate with the receptacle connector, wherein the mating direction of the optical connector is substantially parallel to the surface of the PCB.

Item 38. The assembly of any of items 35 through 37, wherein:
the optoelectronic devices and transceiver light coupling unit are mounted on a surface of a printed circuit board and disposed in a housing of a receptacle connector;
the optical connector comprises a plug connector configured to mate with the receptacle connector and the mating direction of the optical connector is at an angle with respect to the PCB, wherein the angle is not perpendicular or parallel to the surface of the PCB.

Item 39. An optical communication assembly, comprising:
an optical connector comprising an connector light coupling unit, the connector light coupling unit configured to couple light between a plurality of waveguides and a plurality of light redirecting elements, each light redirecting element optically coupled to a corresponding optical waveguide having a core diameter, the light redirecting element being configured to direct light emerging from the optical waveguide such that the directed light has a diameter greater than the core diameter of the optical waveguide;
a plurality of optoelectronic devices;
a plurality of optical elements, each optical element configured to change a divergence of light passing through the optical element, each light redirecting element optically coupled to a corresponding optoelectronic device through a corresponding optical element;
a transceiver light coupling unit configured for mating with the connector light coupling unit and to couple light between the connector light coupling unit and the plurality of optoelectronic devices, the connector light coupling unit having a mating surface and the transceiver light coupling unit having a corresponding mating surface, such that when mating between the connector light coupling unit and the transceiver light coupling unit occurs, the mating surface of the connector light coupling unit initially makes line contact with the mating surface of the transceiver light coupling unit and then the connector light coupling unit rotates to make surface-to-surface contact with the transceiver light coupling unit, the rotation causing the plurality of optical waveguides to bend.

Item 40. An optical communication assembly, comprising:
an optical connector comprising an connector light coupling unit, the connector light coupling unit configured to couple light between a plurality of waveguides and a plurality of light redirecting elements, each light redirecting element optically coupled to a corresponding optical waveguide having a core diameter, the light redirecting element being configured to direct light emerging from the optical waveguide such that the directed light has a diameter greater than the core diameter of the optical waveguide;
a plurality of optoelectronic devices;
a plurality of optical elements, each optical element configured to change a divergence of light passing through the optical element, each light redirecting element optically coupled to a corresponding optoelectronic device through a corresponding optical element;
a transceiver light coupling unit configured for mating with the connector light coupling unit and to couple light between the connector light coupling unit and the plurality of optoelectronic devices, the connector light coupling unit having a mating surface with a mating edge and the transceiver light coupling unit having a corresponding mating surface with a beveled mating edge, the mating surfaces of the connector light coupling unit and the transceiver light coupling unit, after mating, arranged substantially parallel to a mating direction of the optical connector, such that when mating occurs, the mating edge of the connector light coupling unit initially makes contact with the beveled mating edge of the transceiver light coupling unit and as the connector light coupling unit moves along the mating direction, the connector light coupling unit rotates to make surface-to-surface contact between the mating surface of the connector light coupling unit and the mating surface of the transceiver light coupling unit, the rotation causing the plurality of optical waveguides to bend.

Item 41. An optical communication subassembly, comprising:
an connector light coupling unit including a plurality of light redirecting elements, each light redirecting element optically coupled to a corresponding optical waveguide, the light redirecting element being configured to direct light traveling to or from the optical waveguide such that a central ray of light traveling to or from the optical waveguide is redirected by an angle, θ greater than 90 degrees.

Item 42. The subassembly of claim 41, wherein each light redirecting element is further configured to collimate the light.

Item 43. The subassembly of any of claims 41 through 42, wherein θ is greater than about 110 degrees.

Item 44. The subassembly of any of claims 41 through 43, further comprising a transceiver light coupling unit configured to mate with the connector light coupling unit, the transceiver light coupling unit configured to couple light between the plurality of light redirecting elements and a plurality of optoelectronic devices, respectively, wherein the transceiver light coupling unit includes the plurality of refractive elements.

Item 45. An optical communication subassembly, comprising:
a connector light coupling unit configured to couple light between a plurality of waveguides and a plurality of reflective elements, respectively, each reflective element optically coupled to a corresponding optical waveguide, each reflective element being configured to reflect input light to or from the corresponding optical waveguide such that a central ray of input light traveling to or from the corresponding optical waveguide is redirected by a first angle, θ, the reflective element further configured to change the divergence of the input light; and
a plurality of refractive elements, each refractive element optically coupled to a corresponding reflective element, each refractive element configured to change a direction of light traveling to or from the corresponding reflective element by a second angle, φ.

Item 46. The subassembly of item 45, wherein:
each reflective element comprises an optically reflective surface;
each refractive element comprises an optically refractive surface, wherein the reflective surface is not parallel to the refractive surface.

Item 47. The subassembly of any of items 45 through 46, further comprising a transceiver light coupling unit configured to mate with the connector light coupling unit, the transceiver light coupling unit configured to couple light between the plurality of light redirecting elements and a plurality of optoelectronic devices, respectively, wherein the transceiver light coupling unit includes the plurality of refractive elements.

Item 48. The subassembly of any of items 45 through 47, wherein θ is about 90 degrees.

Item 49. The subassembly of any of items 45 through 48, wherein θ+φ is greater than 90 degrees.

Item 50. An optical communication assembly, comprising:
one or more optoelectronic devices;
one or more optical elements, each optical element aligned with a corresponding optoelectronic device;
a transceiver light coupling unit; and
an connector light coupling unit comprising one or more light redirecting features, each light redirecting feature arranged to be optically coupled to a corresponding optical waveguide, wherein the transceiver light coupling unit is configured to mate with the connector light coupling unit so that each light redirecting feature is optically aligned with a corresponding optoelectronic device through a corresponding optical element; and a cover configured to provide protection for components of the assembly, the cover configured to apply force to the optical communication assembly to retain each light redirecting feature in optical alignment with the corresponding optoelectronic device.

Item 51. The assembly of item 50, wherein:
the transceiver light coupling unit includes a first alignment feature; and
the connector light coupling unit includes a second alignment feature configured to engage with the first alignment feature.

Item 52. The assembly of item 51, wherein:
the first alignment feature is a recess; and
the second alignment feature is a protrusion configured to fit within the recess.

Item 53. The assembly of any of items 50 through 52, wherein the cover includes alignment pins and the transceiver light coupling unit and the connector light coupling unit include alignment holes configured to receive the pins.

Item 54. The assembly of any of items 50 through 53, wherein, to mate with the connector light coupling unit, the transceiver light coupling unit fits inside a cavity formed by the connector light coupling unit.

Item 55. The assembly of any of items 50 through 53, wherein, to mate with the transceiver light coupling unit, the connector light coupling unit is configured to fit inside a cavity formed by the transceiver light coupling unit.

Item 56. The assembly of item 55, wherein the transceiver light coupling unit has a mating surface and the connector light coupling unit has a corresponding mating surface parallel to the mating surface of the transceiver light coupling unit, and wherein a mating direction of the connector light coupling unit with the transceiver light coupling unit is substantially parallel to the mating surfaces of the transceiver light coupling unit and the connector light coupling unit.

Item 57. The assembly of item 55, wherein the transceiver light coupling unit has a mating surface and the connector light coupling unit has a corresponding mating surface parallel to the mating surface of the transceiver light coupling unit, and wherein a mating direction of the connector light coupling unit with the transceiver light coupling unit is substantially perpendicular to the mating surfaces of the transceiver light coupling unit and the connector light coupling unit.

Item 58. The assembly of any of items 50 through 57, wherein the cover is in direct contact with the connector light coupling unit.

Item 59. The assembly of any of items 50 through 57, further comprising a tensioning element disposed between the connector light coupling unit and the cover and configured to provide spring force to the connector light coupling unit.

Item 60. The assembly of item 59, wherein the tensioning element comprises a spring.

Item 61. The assembly of item 59, wherein the tensioning element comprises a layer of compliant material.

Item 62. The assembly of any of items 50 through 61, wherein the one or more optoelectronic devices are disposed on a PCB.

Item 63. The assembly of item 62, wherein the assembly further comprises a processor disposed on the PCB.

Item 64. The assembly of item 63, wherein the assembly is a mobile telephone, a portable audio device, a tablet computer, or a laptop computer.

Item 65. An optical communication assembly, comprising:
first and second printed circuit boards (PCBs), the first PCB disposed on a surface of the second PCB, the first PCB having a hole, the first and second PCBs arranged so that sides of the hole and the surface of the second PCB form a recess;
a transceiver light coupling unit arranged on the first PCB and at least partially covering the recess;
one or more optical elements;
one or more optoelectronic devices disposed on the second PCB and within the recess, each optoelectronic device optically aligned with a corresponding optical element;
an connector light coupling unit comprising one or more light redirecting elements, each light redirecting element arranged to be optically coupled to a corresponding optical waveguide, wherein the transceiver light coupling unit is configured to mate with the connector light coupling unit so that each light redirecting element is optically aligned with a corresponding optoelectronic device through a corresponding optical element; and
a cover configured to provide protection for components of the assembly, the cover configured to apply force to the connector light coupling unit to retain each light redirecting element in optical alignment with the corresponding optoelectronic device.

Item 66. An optical communication assembly, comprising:
first and second printed circuit board (PCBs), the first PCB disposed on a surface of the second PCB, the first PCB having a hole, the first and second PCBs arranged so that sides of the hole and the surface of the second PCB form a recess;
a transceiver light coupling unit arranged on the first PCB and at least partially covering the recess;
one or more optical elements;
one or more optoelectronic devices disposed on the second PCB and within the recess, each optoelectronic device optically aligned with a corresponding optical element;
an connector light coupling unit comprising one or more light redirecting elements, each light redirecting element arranged to be optically coupled to a corresponding optical waveguide, wherein the transceiver light coupling unit is configured to mate with the connector light coupling unit so that each light redirecting element is optically aligned with a corresponding optoelectronic device through a corresponding optical element; and
a clip configured to apply force to the connector light coupling unit in a direction perpendicular to a mating surface of the connector light coupling unit to retain each light redirecting element in optical alignment with the corresponding optoelectronic device.

Item 67. An optical communication assembly, comprising:
one or more optoelectronic devices;
one or more optical elements, each optical element aligned with a corresponding optoelectronic device;
a transceiver light coupling unit having a mating surface; and
an connector light coupling unit having a mating surface configured to mate with the mating surface of the transceiver light coupling unit, the connector light coupling unit comprising one or more light redirecting elements, each light redirecting element arranged to be optically coupled to a corresponding optical waveguide, wherein the transceiver light coupling unit is configured to mate with the connector light coupling unit so that each light redirecting element is optically aligned with a corresponding optoelectronic device through a corresponding optical element; and one or more alignment holes extending through planes of the transceiver light coupling unit and the connector light coupling unit mating surfaces, the alignment holes configured to receive alignment pins.

Item 68. The assembly of item 67, wherein the transceiver light coupling unit forms a slot and the connector light coupling unit fits inside the slot.

Item 69. The assembly of any of items 67 through 68, wherein the pins are inserted in a direction different from a mating direction of the connector light coupling unit.

Item 70. The assembly of any of items 67 through 69, wherein the pins are inserted in a direction parallel to the mating direction of the connector light coupling unit.

Item 71. The assembly of any of items 67 through 69, wherein the pins are inserted in a direction perpendicular to the mating direction of the connector light coupling unit.

Item 72. The assembly of item 71, wherein the one or more alignment holes extend substantially orthogonally through mating surfaces of the transceiver light coupling unit and the connector light coupling unit.

Item 73. The assembly of any of items 67 through 72, wherein the transceiver light coupling unit forms a slot, the connector light coupling unit fits inside the slot, and sides of the slot are configured to provide coarse lateral optical alignment between optical components of the optical connector and the optical elements.

Item 74. The assembly of item 73, wherein the alignment pins inserted into the alignment holes provide fine lateral optical alignment between optical components of the optical connector and the optical elements.

Item 75. The assembly of item any of items 67 through 74, wherein the one or more alignment holes are diamond shaped.

Item 76. The assembly of any of items 67 through 75, wherein the one or more alignment holes is a single diamond shaped alignment hole.

Item 77. The assembly of any of items 67 through 76, wherein the alignment holes are tapered.

Item 78. An optical communication assembly, comprising:
  a frame disposed on a PCB;
  one or more optoelectronic devices disposed on the PCB within the frame;
  one or more optical elements, each optical element optically coupled to a corresponding optoelectronic device and configured to change divergence of light passing through the optical element;
  a light coupling unit comprising:
  one or more light re-directing elements, each optically light redirecting element arranged to be optically coupled to a corresponding optical waveguide, wherein the frame is configured to hold the light coupling unit so that each light redirecting element is optically aligned with a corresponding optoelectronic device through a corresponding optical element.

Item 79. The optical communication assembly of item 78, wherein the frame comprises:
  an opening dimensioned to receive the light coupling unit;
  tabs extending into the frame and configured to support the light coupling unit so that each optical element is spaced apart from and in vertical optical alignment with the corresponding optoelectronic device;
  an end portion configured to provide longitudinal optical alignment between the light coupling unit the optoelectronic devices;
  opposing side portions configured to provide lateral optical alignment between the light coupling unit and the optoelectronic devices.

Item 80. The optical communication assembly of any of items 78 through 79, wherein the light coupling unit includes the optical elements.

Item 81. The optical communication assembly of any of items 78 through 80, wherein each optical element is mounted on the corresponding optoelectronic device.

Item 82. The optical communication assembly of any of items 78 through 81, wherein the frame further comprises mounting tabs configured to mount the frame on the PCB.

Item 83. The optical communication assembly of any of items 78 through 82, wherein the frame further comprises a retaining feature configured to provide vertical spring force to the light coupling unit.

Item 84. The optical communication assembly of any of items 76 through 83, wherein the sides of the frame include one or more retaining features configured to engage with compatible retaining features of the light coupling unit.

Item 85. The optical communication assembly of any of items 76 through 84, wherein the end of the frame includes one or more alignment features configured to engage with compatible alignment features of the light coupling unit, the alignment features configured to provide fine lateral and longitudinal optical alignment between the light coupling unit and the optoelectronic devices.

Item 86. The optical communication assembly of item 83, wherein the one or more alignment features comprises a central wedge extending into the frame.

Item 87. The optical communication assembly of item 86, wherein each side of the frame includes a wedge extending into the frame, the side wedges and the central wedge together providing longitudinal and lateral alignment Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical communication assembly comprising:
  an optical waveguide attached to a first light coupling unit, the first light coupling comprising a first mating surface; and
  a second light coupling unit disposed on and optically coupled to an optoelectronic device, the second light coupling unit configured to mate with the first light coupling unit to transfer light between the optical waveguide and the optoelectronic device, the second light coupling unit comprising a second mating surface comprising a first portion angled relative to a second portion, such that as the first light coupling unit approaches the second light coupling unit, the first light coupling unit first makes contact with the first portion of the second mating surface and rotates as it slides along the first portion of the second mating surface, wherein when the first and second light coupling units are in mating positions relative to each other, the first mating surface is disposed on and adjacent to the second portion of the second mating surface.

2. The optical communication assembly of claim 1, wherein the first light coupling unit comprises an input side for receiving incoming light from the optical waveguide, and an output side for outputting outgoing light.

3. The optical communication assembly of claim 2, wherein the first light coupling unit changes a divergence of the outgoing light relative to a divergence of the incoming light.

4. The optical communication assembly of claim 1, wherein when the first and second light coupling units are in the mating positions relative to each other, light transferred between the optical waveguide and the optoelectronic device passes through the first mating surface and the second portion of the second mating surface.

5. The optical communication assembly of claim 1, wherein the second light coupling unit is disposed on a printed circuit board, and wherein the second portion of the second mating surface is parallel to the printed circuit board.

* * * * *